United States Patent
Kato et al.

(10) Patent No.: US 7,738,335 B2
(45) Date of Patent: Jun. 15, 2010

(54) METHOD AND APPARATUS FOR RECORDING INFORMATION ON AN OPTICAL RECORDING MEDIUM

(75) Inventors: Tatsuya Kato, Tokyo (JP); Hajime Utsunomiya, Tokyo (JP)

(73) Assignee: TDK Corporation, Tokyo (JP)

( * ) Notice: Subject to any disclaimer, the term of this patent is extended or adjusted under 35 U.S.C. 154(b) by 783 days.

(21) Appl. No.: 10/492,814

(22) PCT Filed: Oct. 2, 2002

(86) PCT No.: PCT/JP02/10304

§ 371 (c)(1),
(2), (4) Date: Apr. 16, 2004

(87) PCT Pub. No.: WO03/034410

PCT Pub. Date: Apr. 24, 2003

(65) Prior Publication Data

US 2004/0257950 A1    Dec. 23, 2004

(30) Foreign Application Priority Data

Oct. 17, 2001  (JP) .............................. 2001-319806
Oct. 17, 2001  (JP) .............................. 2001-319819

(51) Int. Cl.
   *G11B 7/0045* (2006.01)
(52) U.S. Cl. .................. 369/59.11; 369/53.26; 369/47.5
(58) Field of Classification Search ............... 369/59.11, 369/116, 59.13, 59.15, 59.1, 53.26, 47.5, 369/47.51, 47.52; *G11B 5/09, 7/004, 7/006*
See application file for complete search history.

(56) References Cited

U.S. PATENT DOCUMENTS

| | | | |
|---|---|---|---|
| 6,022,605 A * | 2/2000 | Kaneko et al. | 428/64.1 |
| 6,205,102 B1 * | 3/2001 | Spruit | 369/59.11 |
| 6,222,814 B1 * | 4/2001 | Ichimura | 369/116 |
| 6,312,779 B1 * | 11/2001 | Hirotsune et al. | 428/64.1 |
| 6,339,579 B1 * | 1/2002 | Kamioka et al. | 369/121 |
| 6,411,579 B2 * | 6/2002 | Nobukuni et al. | 369/59.12 |
| 6,442,119 B1 * | 8/2002 | Sunagawa | 369/47.53 |

(Continued)

FOREIGN PATENT DOCUMENTS

JP           6-162507       6/1994

(Continued)

*Primary Examiner*—Wayne R Young
*Assistant Examiner*—Thomas D Alunkal
(74) *Attorney, Agent, or Firm*—Seed IP Law Group PLLC

(57) ABSTRACT

It is an object of the present invention to provide a method of recording information to an optical recording medium that is suited to achieving high data transfer rates.

The method of recording information according to the present invention is adapted for recording information to an optical recording medium by forming on the optical recording medium a plurality of recording marks selected from a group consisting of several types of recording marks each with different lengths, wherein a bottom power of a laser beam used for forming at least one recording mark contained in the group is set to be higher than a reproducing power of a laser beam used for reproducing information. According to the present invention, since the bottom power helps to erase a recording mark, it is possible to maintain a high erase efficiency even when information is recorded by setting a high data transfer rate.

10 Claims, 18 Drawing Sheets

U.S. PATENT DOCUMENTS

| | | | |
|---|---|---|---|
| 6,497,935 B1* | 12/2002 | Ogawa | 428/64.1 |
| 6,600,709 B2* | 7/2003 | Dekker | 369/53.26 |
| 6,667,952 B2* | 12/2003 | Komaki et al. | 369/275.5 |
| 6,687,208 B2* | 2/2004 | Asada et al. | 369/59.11 |
| 6,731,586 B2* | 5/2004 | Seo et al. | 369/116 |
| 6,798,733 B2* | 9/2004 | Inoue et al. | 369/275.3 |
| 6,987,720 B2* | 1/2006 | Miura et al. | 369/59.11 |
| 7,082,090 B2* | 7/2006 | Kato et al. | 369/59.11 |
| 2002/0064117 A1* | 5/2002 | Kato et al. | 369/59.11 |
| 2002/0105883 A1* | 8/2002 | Lee et al. | 369/59.11 |
| 2002/0110063 A1* | 8/2002 | Yamada et al. | 369/47.39 |

FOREIGN PATENT DOCUMENTS

| | | |
|---|---|---|
| JP | 6-295439 | 10/1994 |
| JP | 7-129988 | 5/1995 |
| JP | 9-7176 | 1/1997 |
| JP | 2000-76683 | 3/2000 |
| JP | 2000-155945 | 6/2000 |

* cited by examiner

METHOD AND APPARATUS FOR RECORDING INFORMATION ON AN OPTICAL RECORDING MEDIUM

BACKGROUND OF THE INVENTION

The present invention relates to an optical recording medium, a method of recording information to an optical recording medium and an information recording apparatus, and particularly to an optical recording medium, a method of recording information to an optical recording medium and an information recording apparatus that is suited to achieving high data transfer rates.

DESCRIPTION OF THE PRIOR ART

Optical recording media typified by the CD and the DVD have been widely used as recording media for recording digital data, and a widely used data recording format is a format wherein the lengths of recording marks along the track are modulated depending on the data to be recorded. For example, in a DVD-RW which is one type of optical recording medium whose data is user-rewritable, recording marks of lengths corresponding to 3T to 11T and 14T where T is one clock cycle are used to perform the recording of data.

When a recording mark is formed, a laser beam is projected onto the optical recording medium along the tracks thereof to form an amorphous region having a predetermined length in a recording layer included in the optical recording medium and the thus formed amorphous region is used as a recording mark. Other regions of the recording layer than the amorphous region are in a crystalline phase.

At the time of recording data to optical recording media, rather than illuminating the optical recording medium with a laser beam having the same pulse width as the time corresponding to the length of the recording marks, typically a laser beam consisting of a number of pulse trains determined based on the type of recording mark to be formed is shined onto the optical recording medium to form recording marks of the stipulated length. For example, when recording data onto a DVD-RW as described above, a number of pulses equal to n−1 or n−2 (where n is the type of recording mark, taking a value of either 3 to 11 or 14) is continuously shined, and thus one of the recording marks having a length corresponding to 3T to 11T or 14T is formed. Accordingly, in the case of n−2, one pulse is used to form a recording mark with a length corresponding to 3T, while nine pulses are used to form a recording mark with a length corresponding to 11T. In addition, in the case of n−1, two pulses are used to form a recording mark with a length corresponding to 3T, while ten pulses are used to form a recording mark with a length corresponding to 11T.

In recent years, it has become highly desirable to achieve further increases in the data transfer rate with respect to optical recording media and in order to achieve this, it is necessary to record data at a higher linear velocity. For this, it is effective to increase the crystallization velocity of the phase change material layer used as the recording layer in order to record data at a high velocity. However, when the crystallization velocity of the phase change material layer used as the recording layer is increased, a recording layer in which an amorphous region was once formed tends to be crystallized, namely, re-crystallization of the recording layer tends to occur. When re-crystallization of the recording layer occurs, a recording mark having desired length and shape cannot be formed, whereby jitter of a reproduced signal is increased and in some cases, data cannot be reproduced.

SUMMARY OF THE INVENTION

In a study done by the inventors of the present invention, it was found that in order to prevent the re-crystallization of the recording layer, it was effective to increase the recording power (Pw) of a laser beam used for recording data and decrease the erasing power (Pe) of the laser beam, thereby decreasing a ratio Pe/Pw of the recording power (Pw) and the erasing power (Pe) of a laser beam. It is necessary to set the ratio Pe/Pw of the recording power (Pw) and the erasing power (Pe) of a laser beam to be lower as the crystallization velocity of a phase change material layer becomes higher, namely, the data transfer rate to be accomplished becomes higher.

However, in the case where the erasing power (Pe) of the laser beam used for recording data is set to be lower, when a new recording mark is directly formed on a previously formed recording mark, there arises a risk that the old recording mark cannot be erased in a desired manner and that data cannot be overwritten. In particular, it was found that in the case of setting the ratio Pe/Pw of the recording power (Pw) and the erasing power (Pe) to be equal to or smaller than 0.5 in order to achieve a high data transfer rate, for example, a transfer rate equal to or higher than 70 Mbps when the format efficiency was 80% and directly overwriting data, there arose a high risk that data could not be overwritten and that in the case of setting the ratio Pe/Pw of the recording power (Pw) and the erasing power (Pe) to be equal to or smaller than 0.3 in order to achieve a higher data transfer rate, for example, a transfer rate equal to or higher than 140 Mbps when the format efficiency was 80% and directly overwriting data, there arose an extremely high risk that data could not be overwritten.

Accordingly, an object of the present invention is to provide an improved method of recording information to an optical recording medium and an improved information recording apparatus.

In addition, another object of the present invention is to provide a method of recording information to an optical recording medium and an information recording apparatus that are suited to achieving high data transfer rates.

In addition, another object of the present invention is to provide an optical recording medium that can be recorded at high data transfer rates.

In addition, another object of the present invention is to provide a method of recording information to an optical recording medium and an information recording apparatus that can erase a recording mark which was formed in a desired manner when a new recording mark is directly formed on the old recording mark.

These objects of the present invention can be accomplished by a method of recording information to an optical recording medium where information is recorded by forming on the optical recording medium a plurality of recording marks selected from a group consisting of several types of recording marks each with different lengths, wherein: the method of recording information to an optical recording medium comprises a step of setting a bottom power of a laser beam used for forming at least one recording mark contained in said group to be higher than a reproducing power of a laser beam used for reproducing information, thereby recording information in the optical recording medium.

According to the present invention, since the bottom power of a laser beam used for forming at least one recording mark is set to be higher than the reproducing power, the bottom power of the laser beam helps to erase information and it is therefore possible to maintain a high erase efficiency even when information is recorded by setting a high data transfer rate.

In a preferred aspect of the present invention, information is recorded by setting the bottom power to be lower than an erasing power of a laser beam used for forming the at least one recording mark.

According to this preferred aspect of the present invention, since cooling effect is not excessively lowered, it is possible to effectively prevent a recording layer from being re-crystallized.

In a further preferred aspect of the present invention, information is recorded by setting a ratio of the recording power of a laser beam used for forming the at least one recording mark and the erasing power thereof to be equal to or smaller than 0.5.

In a still further preferred aspect of the present invention, information is recorded by setting a ratio of the recording power of a laser beam used for forming the at least one recording mark and the erasing power thereof to be equal to or smaller than 0.3.

In a further preferred aspect of the present invention, information is recorded by setting a data transfer rate to be equal to or higher than 70 Mbps.

In a still further preferred aspect of the present invention, information is recorded by setting a data transfer rate to be equal to or higher than 140 Mbps.

The above objects of the present invention can be also accomplished by a method of recording information to an optical recording medium where information is recorded by forming on the optical recording medium a plurality of recording marks selected from a group consisting of several types of recording marks each with different lengths, wherein: the method of recording information to an optical recording medium comprises a step of setting a bottom power of a laser beam used for forming a first recording mark contained in said group to be higher than a bottom power of a laser beam used for forming a second recording mark contained in said group, thereby recording information in the optical recording medium.

According to the present invention, since an appropriate bottom power of the laser beam is used for forming each of the first recording mark and the second recording mark, it is possible to maintain a high erase efficiency even when information is recorded by setting a high data transfer rate.

In a preferred aspect of the present invention, information is recorded by setting the bottom power of the laser beam used for forming the first recording mark to be higher than a reproducing power used for reproducing information.

According to this preferred aspect of the present invention, since the bottom power of the laser beam used for forming the first recording mark is set to be higher than the reproducing power, the bottom power of the laser beam helps to erase information and it is therefore possible to maintain a high erase efficiency even when information is recorded by setting a high data transfer rate.

In a further preferred aspect of the present invention, information is recorded by setting the bottom power of the laser beam used for forming the second recording mark to be higher than a reproducing power used for reproducing information.

In a further preferred aspect of the present invention, the first recording mark is a recording mark that is the shortest among recording marks contained within said group.

The above objects of the present invention can be also accomplished by a method of recording information to an optical recording medium where information is recorded by forming on the optical recording medium a plurality of recording marks selected from a group consisting of several types of recording marks each with different lengths, wherein: the method of recording information to an optical recording medium comprises a step of varying a bottom power of a laser beam used for forming at least one recording mark between a plurality of levels, thereby recording information in the optical recording medium.

In a preferred aspect of the present invention, information is recorded by setting the bottom power of a laser beam during a cooling interval to be higher than at least one bottom power in other intervals.

In a further preferred aspect of the present invention, information is recorded by setting the bottom power of a laser beam during the cooling interval to be higher than a reproducing power of a laser beam used for reproducing information.

In a further preferred aspect of the present invention, information is recorded by setting the bottom power of a laser beam during the cooling interval to be lower than an erasing power of a laser beam used for forming the at least one recording mark.

According to the present invention, since the bottom power of the laser beam is varied between a plurality of levels, thereby recording information in the optical recording medium, if the bottom power is set to be an appropriate level, it is therefore possible to maintain a high erase efficiency even when information is recorded by setting a high data transfer rate.

The above objects of the present invention can be also accomplished by an information recording apparatus that reproduces information recorded in an optical recording medium and records information in an optical recording medium by projecting a laser beam onto an optical recording medium, wherein: the information recording apparatus is constituted so as to set a reproducing power Pr of a laser beam used for reproducing data from a predetermined optical recording medium, and a recording power Pw, an erasing power Pe and a bottom power Pb of a laser beam used for recording data in the predetermined optical recording medium so that the recording power Pw is higher than the erasing power Pe, the erasing power Pe is higher than the bottom power Pb and the bottom power Pb is higher than the reproducing power Pr, thereby recording data in the predetermined optical recording medium.

The above objects of the present invention can be also accomplished by an information recording apparatus that reproduces information recorded in an optical recording medium and records information in the optical recording medium by projecting a laser beam onto the optical recording medium, wherein: the information recording apparatus is constituted so as to set a recording power Pw and an erasing power Pe of a laser beam used for recording data in the optical recording medium, a bottom power Pb1 during a cooling interval and a bottom power Pb2 in intervals other than the cooling interval so that the recording power Pw is higher than the erasing power Pe, the erasing power Pe is higher than the bottom power Pb and the bottom power Pb2 is higher than the bottom power Pb1, thereby recording data in the predetermined optical recording medium.

The above objects of the present invention can be also accomplished by an optical recording medium comprising at least a recording layer where information is recorded by forming a plurality of recording marks selected from a group consisting of several types of recording marks each with different lengths, wherein: the optical recording medium comprises setting information required to set a bottom power of a laser beam used for forming at least one recording mark contained in the group to be higher than a reproducing power of a laser beam used for reproducing the information and perform the recording of the information.

In a preferred aspect of the present invention, the setting information further comprises information required to set the bottom power to be lower than an erasing power of a laser beam used for forming the at least one recording mark and perform the recording of the information.

The above objects of the present invention can be also accomplished by an optical recording medium comprising at least a recording layer where information is recorded by forming a plurality of recording marks selected from a group consisting of several types of recording marks each with different lengths, wherein: the optical recording medium comprises setting information required to set a bottom power of a laser beam used for forming a first recording mark contained in the group to be higher than a bottom power of a laser beam used for forming a second recording mark contained in the group and perform the recording of the information.

In a preferred aspect of the present invention, the setting information further comprises information required to set the bottom power of the laser beam used for forming the first recording mark contained in the group to be higher than a reproducing power of a laser beam used for reproducing the information and perform the recording of the information.

In a further preferred aspect of the present invention, the first recording mark is a recording mark that is the shortest among recording marks contained within said group.

The above objects of the present invention can be also accomplished by an optical recording medium comprising at least a recording layer where information is recorded by forming a plurality of recording marks selected from a group consisting of several types of recording marks each with different lengths, wherein: the optical recording medium comprises setting information required to vary a bottom power of a laser beam used for forming at least one recording mark between a plurality of levels and perform the recording of the information.

In a preferred aspect of the present invention, the setting information further comprises information required to set a bottom power of a laser beam used during a cooling interval to be higher than at least one bottom power of a laser beam used in intervals other than the cooling interval and perform the recording of the information.

According to this preferred aspect of the present invention, since the bottom power of the laser beam used during the cooling interval is set to be higher than the at least one bottom power of the laser beam used in intervals other than the cooling interval, the bottom power of the laser beam used during the cooling interval helps to erase information and it is therefore possible to maintain a high erase efficiency even when information is recorded by setting a high data transfer rate.

In a further preferred aspect of the present invention, the setting information further comprises information required to set the bottom power of the laser beam used during the cooling interval to be higher than all bottom powers of laser beams used in intervals other than the cooling interval and perform the recording of the information.

In a still further preferred aspect of the present invention, the setting information further comprises information required to set the bottom power of the laser beam used during the cooling interval to be higher than a reproducing power of a laser beam used for reproducing the information and perform the recording of the information.

In a still further preferred aspect of the present invention, the setting information further comprises information required to set the bottom power of the laser beam used during the cooling interval to be lower than erasing powers of laser beams used for forming the recording marks and perform the recording of the information.

According to this preferred aspect of the present invention, since cooling effect is not excessively lowered, it is possible to effectively prevent the at least one recording layer from being re-crystallized.

In a further preferred aspect of the present invention, the setting information further comprises information required to set a ratio of a recording power of a laser beam used for forming the at least one recording mark and the erasing power thereof to be equal to or smaller than 0.5 and perform the recording of the information.

In a still further preferred aspect of the present invention, the setting information further comprises information required to set a ratio of a recording power of a laser beam used for forming the at least one recording mark and the erasing power thereof to be equal to or smaller than 0.3 and perform the recording of the information.

In a further preferred aspect of the present invention, the setting information further comprises information required to set a data transfer rate to be equal to or higher than 70 Mbps and perform the recording of the information.

In a still further preferred aspect of the present invention, the setting information further comprises information required to set a data transfer rate to be equal to or higher than 140 Mbps and perform the recording of the information.

DESCRIPTION OF THE PREFERRED EMBODIMENTS

Preferred embodiments of the present invention will be explained in detail with reference to the drawings.

Figure 1:
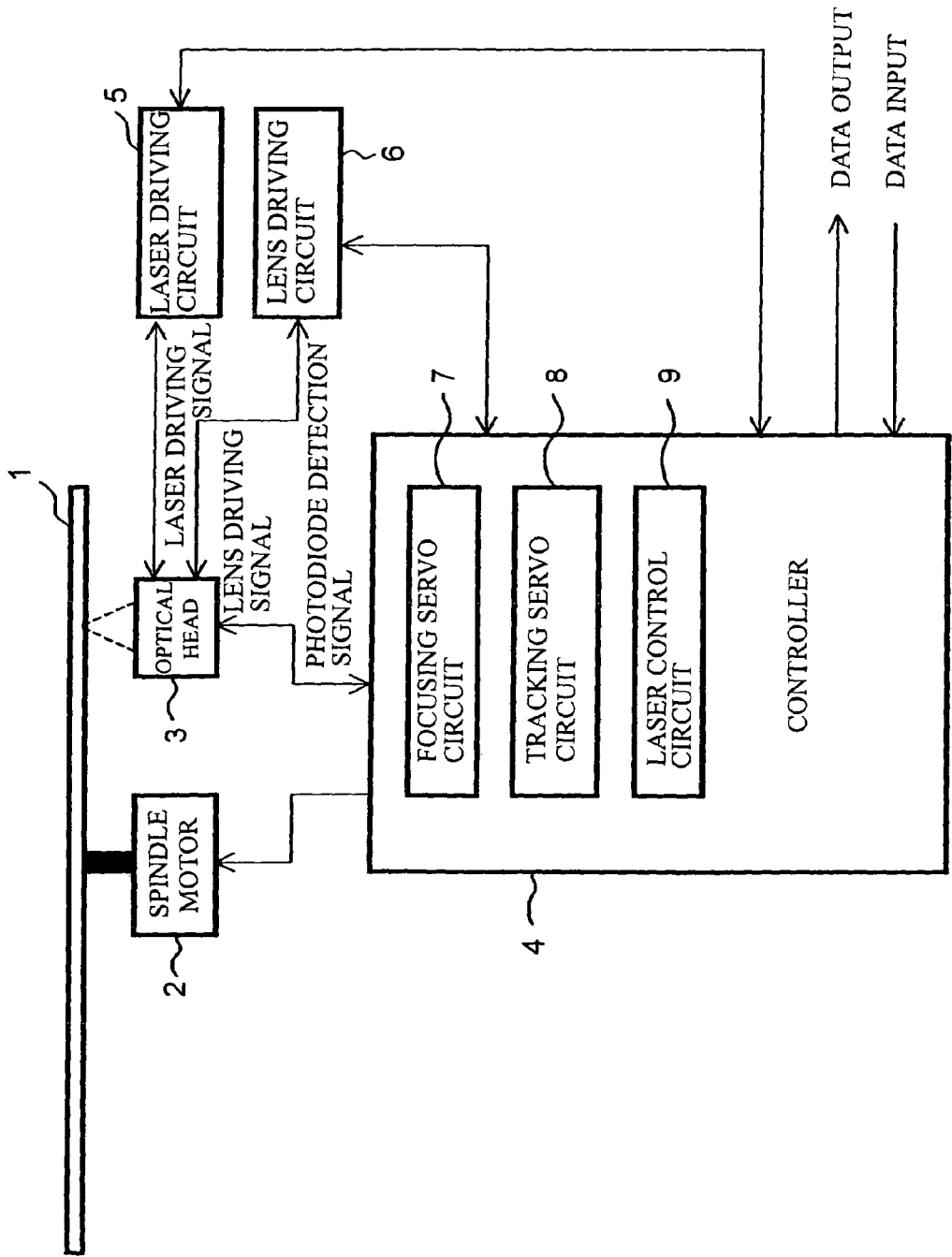
FIG. 1 is a schematic drawing of the major components of an information recording apparatus according to a preferred embodiment of the present invention.

FIG. 1 is a schematic drawing of the major components of an information recording apparatus according to a preferred embodiment of the present invention.

As shown in FIG. 1, the information recording apparatus according to this embodiment is equipped with a spindle motor 2 for rotating an optical recording medium 1, an optical head 3 for shining a laser beam onto the optical recording medium 1, a controller 4 for controlling the operation of the spindle motor 2 and the optical head 3, a laser driving circuit 5 that supplies a laser driving signal to the optical head 3, and a lens driving circuit 6 that supplies a lens driving signal to the optical head 3.

Moreover, as shown in FIG. 1, the controller 4 includes a focusing servo circuit 7, a tracking servo circuit 8, and a laser control circuit 9. When the focusing servo circuit 7 is activated, the focus is aligned with the recording surface of the rotating optical recording medium 1, and when the tracking servo circuit 8 is activated, the spot of the laser beam begins to automatically track the eccentric signal track of the optical recording medium 1. The focusing servo circuit 7 and tracking servo circuit 8 are provided with an auto gain control function for automatically adjusting the focusing gain and an auto gain control function for automatically adjusting the tracking gain, respectively. In addition, the laser control circuit 9 is a circuit that generates the laser driving signal supplied by the laser driving circuit 5, generates a laser driving signal based on recording condition setting information recorded on the optical recording medium 1 when recording data so that the power of a laser beam can be appropriately modulated and generates a laser driving signal based on the kind of the optical recording medium 1 when reproducing data so that the power of a laser beam can be set to a predetermined power. The power of a laser beam used for reproducing data is determined in advance by the standard for each kind of the optical recording media.

Here, the "recording condition setting information" refers to various conditions required for recording data on the optical recording medium 1. In this embodiment, the recording condition setting information includes at least information required to determine the power of the laser beam used for recording data and information required to determine the pulse train pattern to be described later in detail. The recording condition setting information may include not only various conditions required to record data indicated specifically, but also the recording conditions may be identified by specifying one of several conditions stored in advance within the information recording apparatus.

Note that the focusing servo circuit 7, tracking servo circuit 8 and laser control circuit 9 need not be circuits incorporated in the controller 4 but can instead be components separate of the controller 4. Moreover, they need not be physical circuits but can instead be accomplished by software programs executed in the controller 4.

Figure 2:
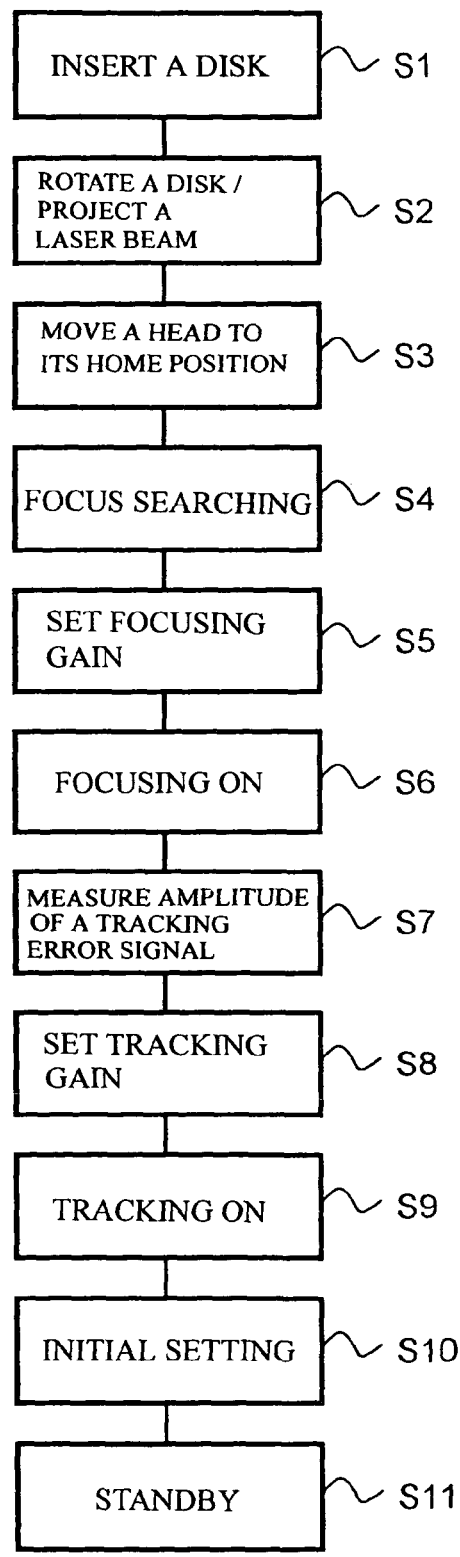
FIG. 2 is a flow chart showing operations conducted after an optical recording medium 1 is inserted into an information recording apparatus according to a preferred embodiment of the present invention and the information recording apparatus switches to standby.

FIG. 2 is a flow chart showing operations conducted after the optical recording medium 1 is inserted into the information recording apparatus according to this embodiment and the information recording apparatus switches to standby.

As shown in FIG. 2, when the optical recording medium 1 is inserted into the information recording apparatus according to this embodiment (Step S1), the controller 4 first drives the spindle motor 2, thereby rotating the optical recording medium 1 and simultaneously causes the laser driving circuit 5 to drive the head 3, thereby projecting a laser beam onto a recording surface of the optical recording medium 1 (Step S2). Then, the controller 4 causes the laser driving circuit 5 to return the head to its home position (Step 3).

Further, the controller 4 conducts focus searching operation, whereby a focus position is determined (Step 4). During the focus searching operation, the head 3 is moved perpendicularly to the recording surface of the optical recording medium 1 under the control of the lens driving circuit 6. The controller 4 then sets focusing gain (Step 5).

When the focus searching operation (Step 4) and the focusing gain setting operation (Step 5) have been completed in this manner, the controller 4 activates the focusing servo circuit 7. Namely, the controller 4 turns the focusing on (Step 6). As a result, the focus is aligned with the recording surface of the rotating optical recording medium 1. When the tracking servo circuit 8 is activated, the focusing gain is automatically adjusted by an auto gain control function.

Then, the controller 4 measures the amplitude of a tracking error signal (Step 7) and sets tracking gain (Step 8). The tracking gain is set (Step 8) by selecting an appropriate tracking gain based on the amplitude of the tracking error signal measured at Step 7.

When the tracking gain setting operation (Step 8) has been completed in this manner, the controller 4 activates the tracking servo circuit 8, namely, turns the tracking on. As a result, the spot of the laser beam begins to automatically track the eccentric track of the optical recording medium 1. When the tracking servo circuit 8 is activated, the tracking gain is automatically adjusted by an auto gain control function.

When the focusing servo circuit 7 and the tracking servo circuit 8 have been activated in this manner, the controller 4 conducts an initial setting operation by detecting address information, reading file registration information, reading the recording condition setting information and so on (Step 10)

and the information recording apparatus switches to standby (Step 11). When the information recording apparatus switches to standby, it becomes ready to receive instructions from a user and when it is instructed by the user to record data under this state, for example, the information recording apparatus starts recording data.

Here follows a description of the structure of an optical recording medium according to the present embodiment.

Figure 3:
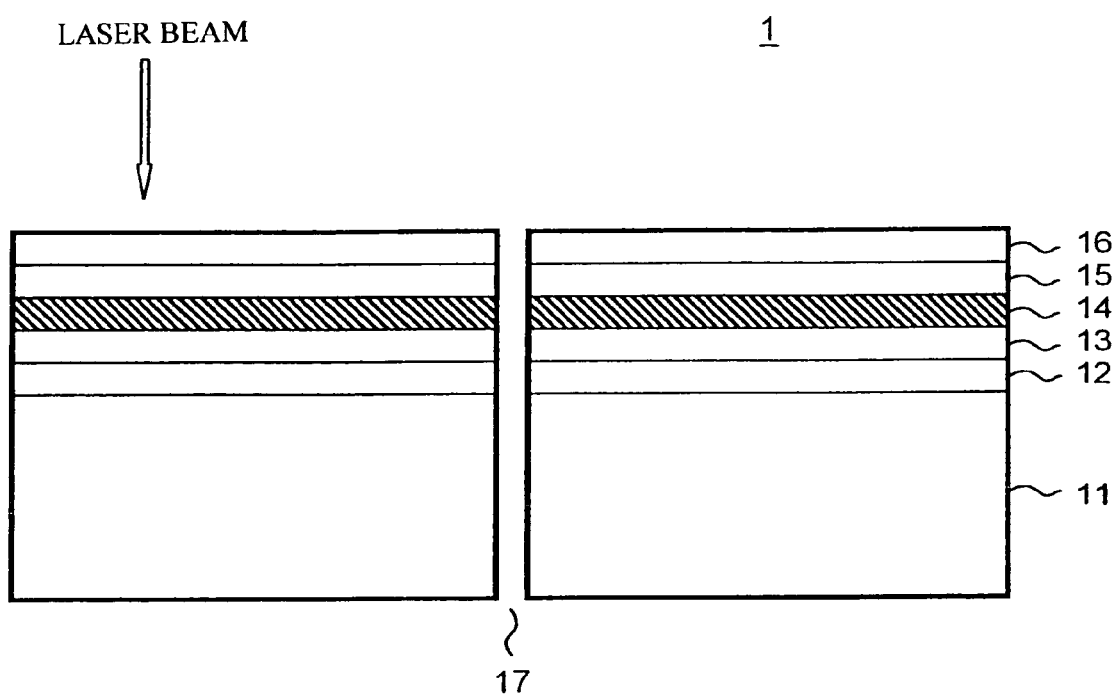
FIG. 3 is a schematic cross section illustrating the structure of an optical recording medium 1 according to a preferred embodiment of the present invention.

FIG. 3 is a schematic cross section illustrating the structure of an optical recording medium 1 according to the present embodiment.

As shown in FIG. 3, the optical recording medium 1 consists of a substrate 11 with a thickness of approximately 1.1 mm, a reflective layer 12 with a thickness of approximately 10 to 300 nm, a second dielectric layer 13 with a thickness of approximately 10 to 50 nm, a recording layer 14 with a thickness of approximately 5 to 30 nm, a first dielectric layer 15 with a thickness of approximately 3 to 30 nm, and a light transmission layer 16 with a thickness of approximately 50 to 150 μm. In addition, a hole 17 is provided in the center of the optical recording medium 1. When recording data onto an optical recording medium with such a structure, the working distance (the distance between the objective lens used to focus the laser beam when data are reproduced and when data are recorded, which is a part of the optical head 3, and the surface of the optical recording medium 1) is set extremely short (e.g., approximately 80 to 150 μm), and thus a beam spot diameter much smaller than that in the past is achieved. With an optical recording medium 1 having such a structure, it is possible to achieve a high data capacity and a high data transfer rate. In addition, the recording condition setting information described above is recorded on the optical recording medium 1. The recording condition setting information may be recorded as a wobble signal or pre-pits, or it may be recorded as data in the recording layer 14.

The recording layer 14 of the optical recording medium 1 is made up of a phase-change film that has a different reflectance in the crystalline phase from in the amorphous phase, and this property is utilized to record data. In order to enable data recording at a high transfer rate, it is necessary to constitute the recording layer 14 as a phase change material film having a higher crystallization velocity.

The unrecorded regions of the recording layer 14 are crystalline so their reflectance may be 20%, for example. To record some sort of data in such unrecorded regions, certain portions of the recording layer 14 depending on the data to be recorded are heated to a temperature in excess of the melting point and then rapidly cooled to change them into the amorphous state. The reflectance of the amorphous portions may become 7%, for example, assuming the state in which the stipulated data is recorded. Moreover, to overwrite data once it is recorded, the portions of the recording layer 14 that are recorded with data to be overwritten are heated to either above the crystallization temperature or above the melting point depending on the data to be recorded, thus changing it into the crystalline or amorphous state.

In this embodiment, a recording power Pw of the laser beam shined in order to melt the recording layer 14, a bottom power Pb of the laser beam shined when cooling the recording layer 14 and an erasing power Pe of the laser beam shined when crystallizing the recording layer 14 are set so as to have the following relationship:

$Pw > Pe > Pb$.

Accordingly, in this embodiment, when recording data to the optical recording medium 1, the controller 4 controls the laser driving circuit 5 via the laser control circuit 9 so that the power of the laser beam assumes the values Pw, Pe or Pb based on the recording condition setting information read from the optical recording medium 1, and the laser driving circuit 5 controls the power of the laser driving signal based thereupon.

In this embodiment, in order to prevent the phase change material film forming the recording layer 14 from being recrystallized, the recording power Pw of the laser beam used for recording data is set high and the erasing power Pe thereof is set low. Actual values of the recording power Pw and the erasing power Pe thereof can be set based on the crystallization velocity of the phase change material film forming the recording layer 14. For example, in the case where a phase change material film having a high crystallization velocity is used to form the recording layer 14 in order to achieve a data transfer rate of 70 Mbps or greater taking the format efficiency to be approximately 80%, it is preferable to set the ratio Pe/Pw of the recording power Pw and the erasing power Pe to be equal to or smaller than 0.5 and in the case where a phase change material film of a higher crystallization velocity is used to form the recording layer 14 in order to achieve a data transfer rate of 140 Mbps or greater taking the format efficiency to be approximately 80%, it is preferable to set the ratio Pe/Pw of the recording power Pw and the erasing power Pe to be equal to or smaller than 0.3. For instance, in order to achieve a data transfer rate of 140 Mbps taking the format efficiency to be approximately 80%, the recording power PW and the erasing power Pe may be set to be 9.0 mW and 2.6 mW, respectively, and in this case, the ratio Pe/Pw of the recording power Pw and the erasing power Pe is about 0.29.

On the other hand, in the case where data recorded in the optical recording medium 1 are reproduced, the controller 4 controls the laser driving circuit 5 based on the kind of the optical recording medium 1 via the laser control circuit 9 so as to determine the power of the laser beam to be a reproducing power Pr and the laser driving circuit 5 controls the power of a laser driving signal based on the thus determined reproducing power Pr. Here, the level of the reproducing power Pr of the laser beam is determined sufficiently low so as to prevent the temperature of the recording layer 14 of the optical recording medium 1 from reaching the crystallization temperature of the phase change material film and to be lower than the bottom power Pb.

For example, the bottom power Pb of the laser beam used for recording data and the reproducing power Pr are determined to be 0.5 mW and 0.3 mW, respectively.

In this manner, in this embodiment, the bottom power Pb of the laser beam used for recording data is set to be higher than the reproducing power Pr. As a result, a larger amount of heat is given to the recording layer 14 of the optical recording medium 1, even in the case where the power of the laser beam is set to be the bottom power Pb, than in the case where data are reproduced.

Here follows a description of the modulation scheme used in a method of recording information according to this embodiment.

In the information recording method according to this preferred embodiment, the (1,7) RLL modulation scheme can be adopted. However, the application of the information recording method according to the present invention is not limited to the case in which this modulation scheme is used, but rather it is naturally applicable to cases in which another modulation scheme is used. Note that in this Specification, the method of shining the laser beam in order to form a recording mark, namely the number of pulses in the laser beam, pulse width of each pulse, pulse interval, pulse power and other settings are collectively called the "pulse train pattern." Note that the pulse train pattern is also called the "recording strategy."

In addition, the recording condition setting information incorporated into the optical recording medium 1 contains content for determining which pulse train pattern should be used to record data, so the information recording apparatus shown in FIG. 1 performs the recording of data with the pulse train pattern to be described in detail below based on this determination.

Next, examples of pulse train patterns will be explained in the case where the (1,7) RLL modulation scheme is adopted.

Figure 4:
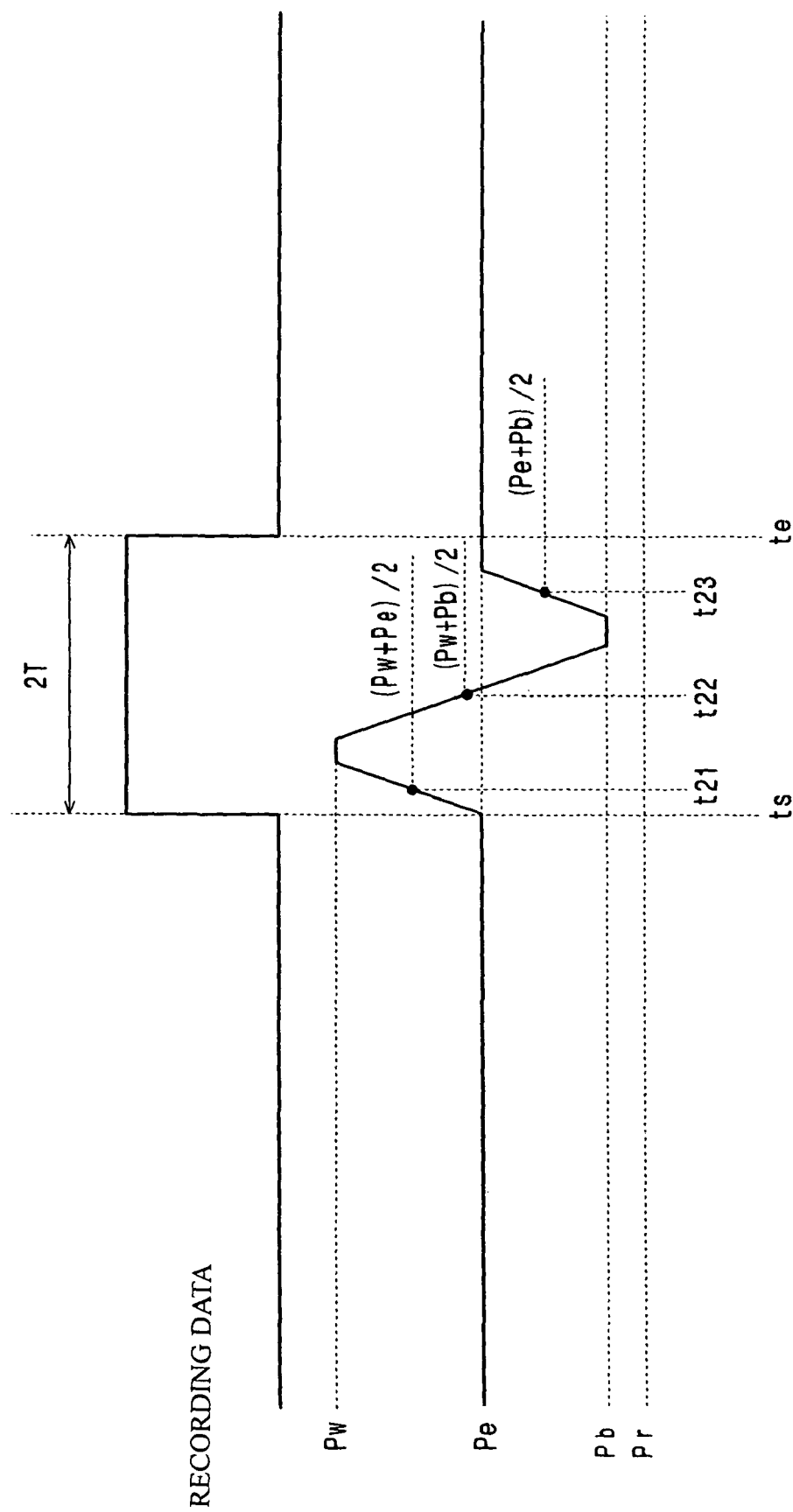
FIG. 4 is a drawing illustrating the pulse train pattern in the case of forming a recording mark of a length corresponding to 2T in a preferred embodiment of the present invention.

FIG. 4 is a drawing illustrating the pulse train pattern in the case of forming a recording mark of a length corresponding to 2T.

As shown in FIG. 4, when forming a recording mark of a length corresponding to 2T, the number of pulses in the laser beam is set to 1. Here, the number of pulses in the laser beam is defined by the number of times the power of the laser beam shined during recording is raised to Pw. More specifically, taking the time $t_s$ to be the timing at which the laser beam is positioned at the starting point of the recording mark and the time $t_e$ to be the timing at which the laser beam is positioned at the ending point of the recording mark, during the period from the time $t_s$ to the time $t_e$, the laser beam power is first set to Pw and then set to the power Pb. Here, the laser beam power before the time $t_s$ is set to Pe and the power of the laser beam begins to rise at the time $t_s$. In addition, the laser beam power at the time $t_e$ is set to Pe or Pb.

Here, when the interval from time $t_{21}$ to time $t_{22}$ shown on FIG. 4 is defined to be $T_{top(2T)}$ and the interval from time $t_{22}$ to time $t_{23}$ is defined to be $T_{cl(2T)}$, $T_{top(2T)}$ is set to ~0.6T and $T_{cl(2T)}$ is set to ~0.7T. As shown in FIG. 4, the time $t_{21}$ is the timing at which the laser beam power exceeds (Pw+Pe)/2, the time $t_{22}$ is the timing at which the laser beam power drops below (Pw+Pb)/2, and the time $t_{23}$ is the timing at which the laser beam power exceeds (Pe+Pb)/2.

During the interval $T_{top(2T)}$ (the heating interval), the recording layer 14 of the optical recording medium 1 receives a large amount of energy and its temperature exceeds the melting point, and during the interval $T_{cl(2T)}$ (the cooling interval), the recording layer 14 of the optical recording medium 1 is rapidly cooled. Thereby, a recording mark of a length corresponding to 2T is formed in the recording layer 14 of the optical recording medium 1.

Figure 5:
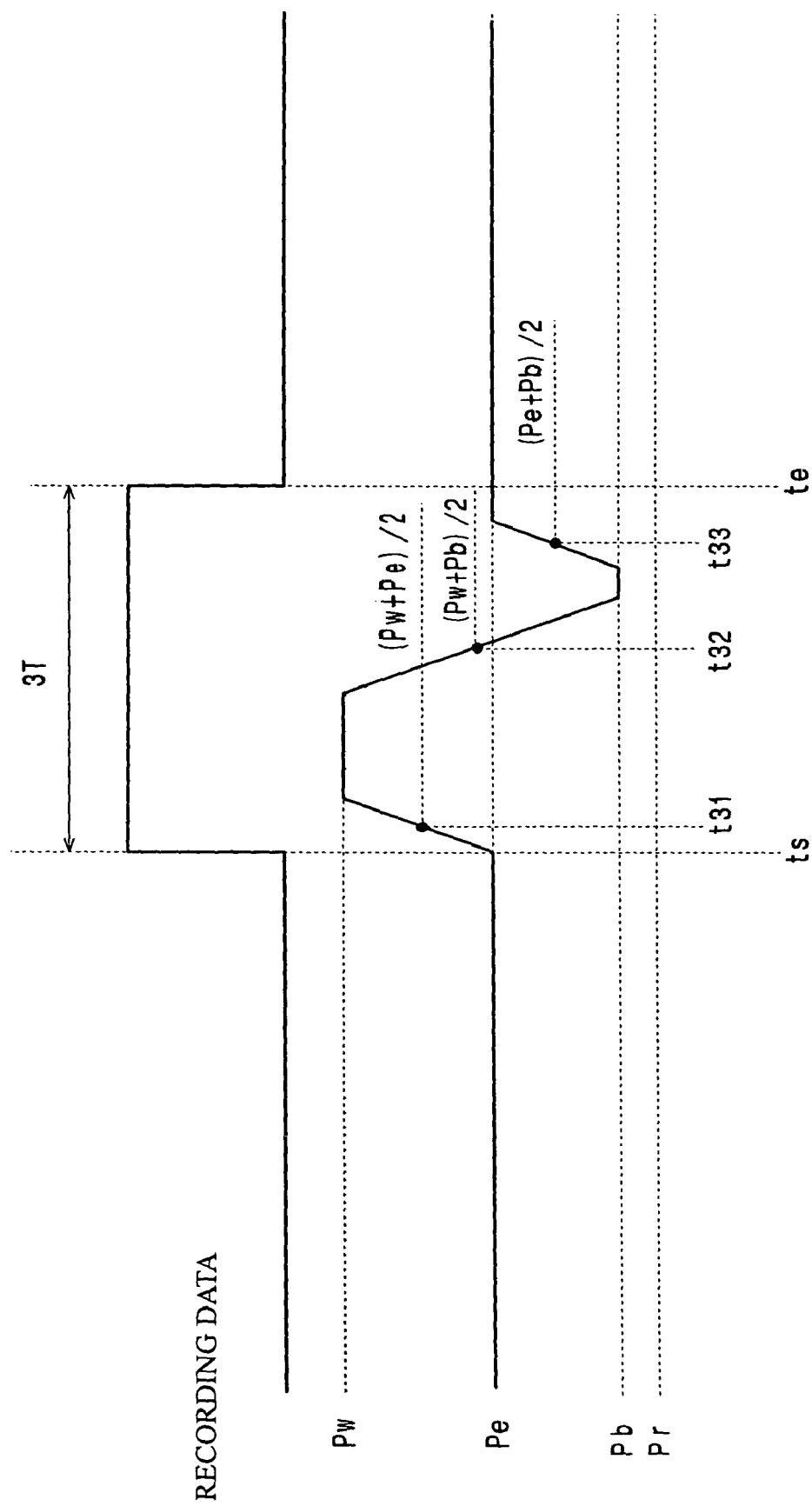
FIG. 5 is a drawing illustrating the pulse train pattern in the case of forming a recording mark of a length corresponding to 3T in a preferred embodiment of the present invention.

FIG. 5 is a drawing illustrating the pulse train pattern in the case of forming a recording mark of a length corresponding to 3T.

As shown in FIG. 5, when forming a recording mark of a length corresponding to 3T, the number of pulses in the laser beam is set to 1. More specifically, during the period from the time $t_s$ to the time $t_e$, the laser beam power is first set to Pw and then set to the power Pb. Here, the laser beam power before the time $t_s$ is set to Pe and the power of the laser beam begins to rise at the time $t_s$. In addition, the laser beam power at the time $t_e$ is set to Pe or Pb.

Here, when the interval from time $t_{31}$ to time $t_{32}$ shown on FIG. 5 is defined to be $T_{top(3T)}$ and the interval from time $t_{32}$ to time $t_{33}$ is defined to be $T_{cl(3T)}$, $T_{top(3T)}$ is set to ~1.3T and $T_{cl(3T)}$ is set to ~0.7T. As shown in FIG. 5, the time $t_{31}$ is the timing at which the laser beam power exceeds (Pw+Pe)/2, the time $t_{32}$ is the timing at which the laser beam power drops below (Pw+Pb)/2, and the time $t_{33}$ is the timing at which the laser beam power exceeds (Pe+Pb)/2.

During the interval $T_{top(3T)}$ (the heating interval), the recording layer 14 of the optical recording medium 1 receives a large amount of energy and its temperature exceeds the melting point, and during the interval $T_{cl(3T)}$ (the cooling interval), the recording layer 14 of the optical recording medium 1 is rapidly cooled. Thereby, a recording mark of a length corresponding to 3T is formed in the recording layer 14 of the optical recording medium 1.

Figure 6:
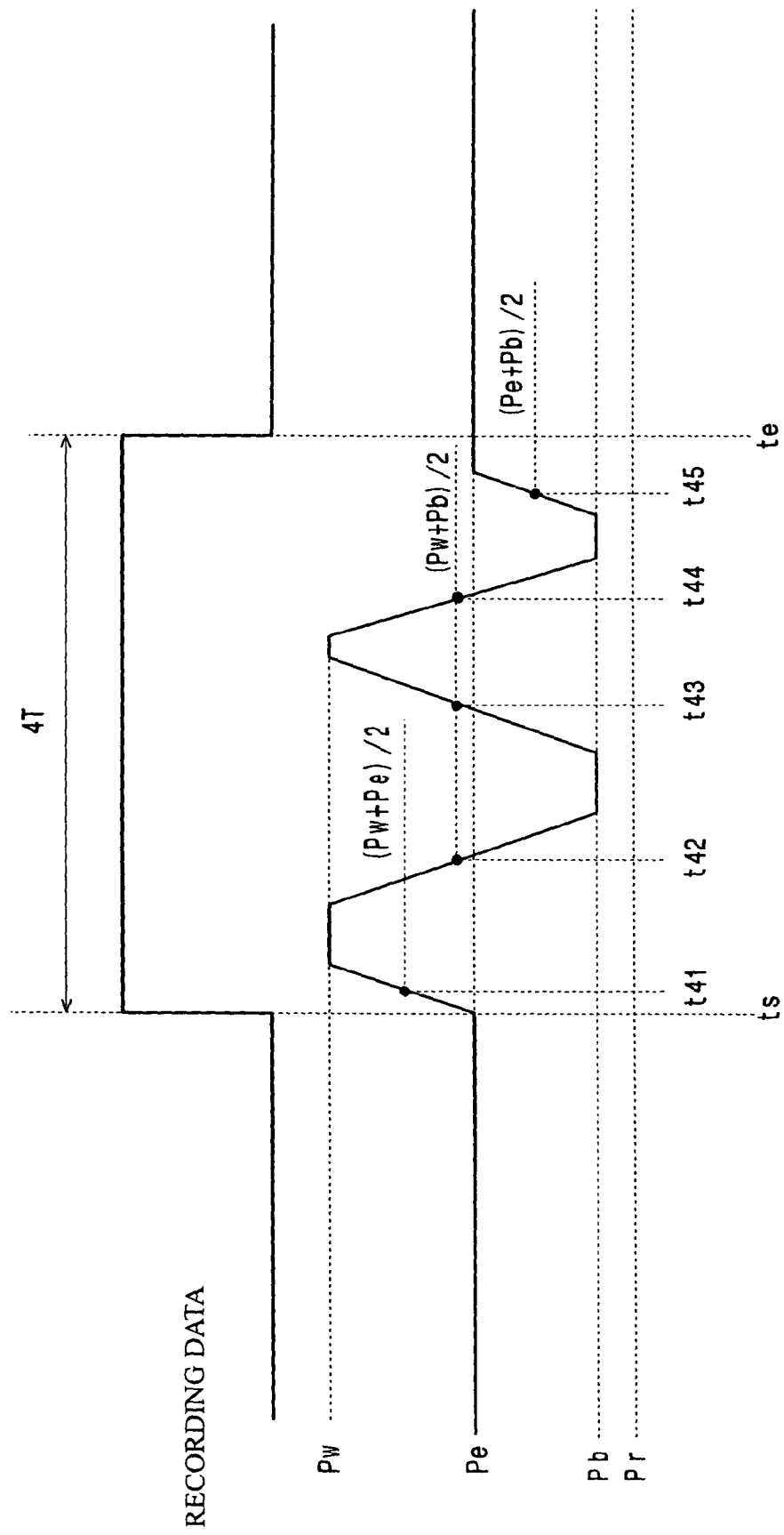
FIG. 6 is a drawing illustrating the pulse train pattern in the case of forming a recording mark of a length corresponding to 4T in a preferred embodiment of the present invention.

FIG. 6 is a drawing illustrating the pulse train pattern in the case of forming a recording mark of a length corresponding to 4T.

As shown in FIG. 6, when forming a recording mark of a length corresponding to 4T, the number of pulses in the laser beam is set to 2. More specifically, during the period from the time $t_s$ to the time $t_e$, the set consisting of the combination of the laser beam power being first set to Pw and then being set to the power Pb is repeated twice. Here, the laser beam power before the time t, is set to Pe and the power of the laser beam begins to rise at the time $t_s$. In addition, the laser beam power at the time $t_e$ is set to Pe or Pb.

Here, when the interval from time $t_{41}$ to time $t_{42}$ shown on FIG. 6 is defined to be $T_{top(4T)}$, the interval from time $t_{42}$ to time $t_{43}$ is defined to be $T_{off(4T)}$, the interval from time $t_{43}$ to time $t_{44}$ is defined to be $T_{last(4T)}$, and the interval from time $t_{44}$ to time $t_{45}$ is defined to be $T_{cl(4T)}$, $T_{top(4T)}$ is set to ~1.0T, $T_{off(4T)}$ is set to ~1.0T, $T_{last(4T)}$ is set to ~0.7T, and $T_{cl(4T)}$ is set to ~0.7T. As shown in FIG. 6, the time $t_{41}$ is the timing at which the laser beam power exceeds (Pw+Pe)/2, the times $t_{42}$ and $t_{44}$ are the timing at which the laser beam power drops below (Pw+Pb)/2, the time $t_{43}$ is the timing at which the laser beam power exceeds (Pw+Pb)/2, and the time $t_{45}$ is the timing at which the laser beam power exceeds (Pe+Pb)/2.

During the intervals $T_{top(4T)}$, $T_{off(4T)}$, and $T_{last(4T)}$ (the heating intervals), the recording layer 14 of the optical recording medium 1 receives a large amount of energy and its temperature exceeds the melting point, and during the interval $T_{cl(4T)}$ (the cooling interval), the recording layer 14 of the optical recording medium 1 is rapidly cooled. Thereby, a recording mark of a length corresponding to 4T is formed in the recording layer 14 of the optical recording medium 1.

Figure 7:
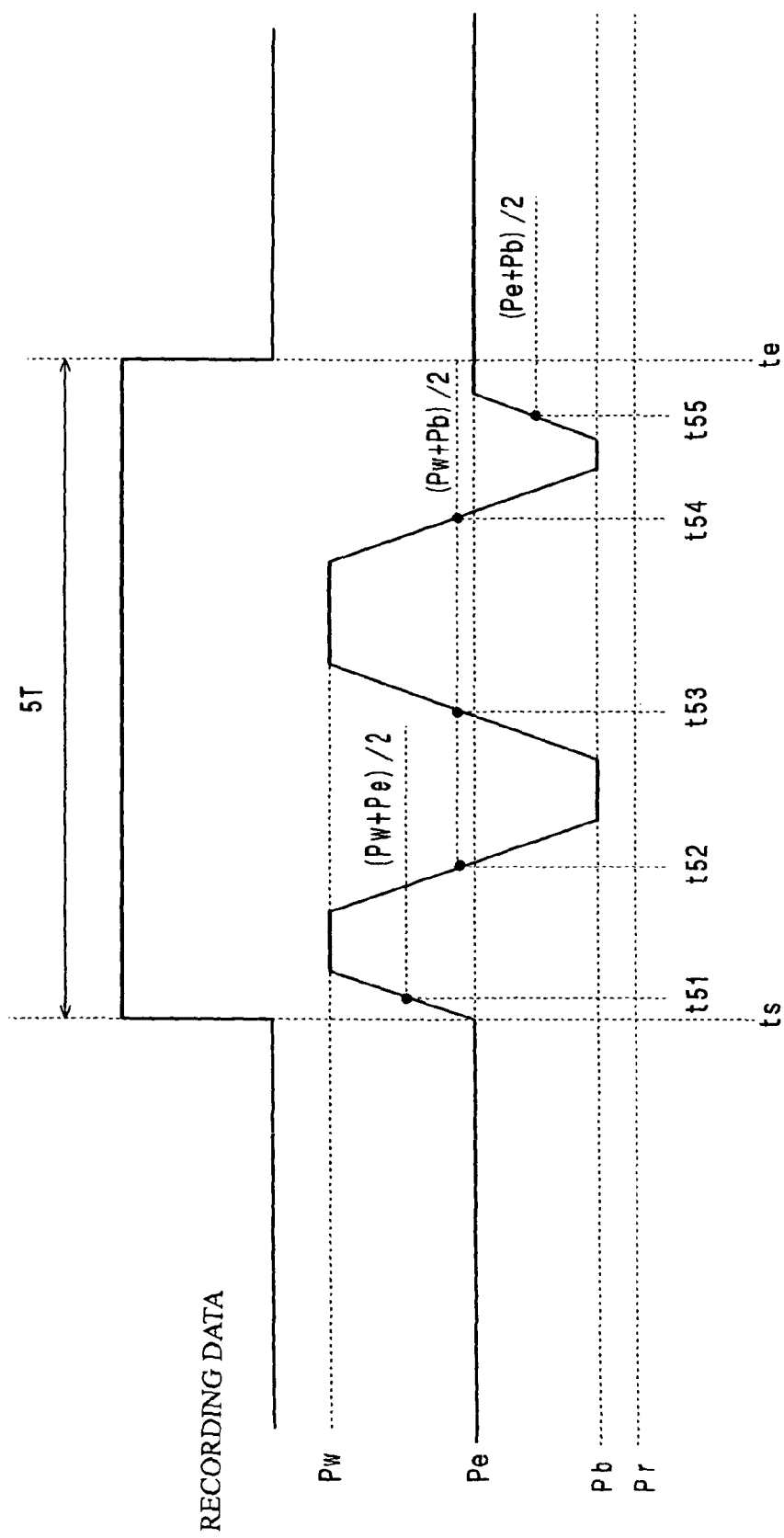
FIG. 7 is a drawing illustrating the pulse train pattern in the case of forming a recording mark of a length corresponding to 5T in a preferred embodiment of the present invention.

FIG. 7 is a drawing illustrating the pulse train pattern in the case of forming a recording mark of a length corresponding to 5T.

As shown in FIG. 7, when forming a recording mark of a length corresponding to 5T, the number of pulses in the laser beam is set to 2. More specifically, during the period from the time $t_s$ to the time $t_e$, the set consisting of the combination of the laser beam power being first set to Pw and then being set to the power Pb is repeated twice. Here, the laser beam power before the time $t_s$ is set to Pe and the power of the laser beam begins to rise at the time $t_s$. In addition, the laser beam power at the time $t_e$ is set to Pe or Pb.

Here, when the interval from time $t_{51}$ to time $t_{52}$ shown on FIG. 6 is defined to be $T_{top(5T)}$, the interval from time $t_{52}$ to time $t_{53}$ is defined to be $T_{off(5T)}$, the interval from time $t_{53}$ to time $t_{54}$ is defined to be $T_{last(5T)}$, and the interval from time $t_{54}$ to time $t_{55}$ is defined to be $T_{cl(5T)}$, $T_{top(5T)}$ is set to ~1.0T, $T_{off(5T)}$ is set to ~1.0T, $T_{last(5T)}$ is set to ~1.3T, and $T_{cl(5T)}$ is set to ~0.7T. As shown in FIG. 6, the time $t_{51}$ is the timing at which the laser beam power exceeds $(P_w+P_e)/2$, the times $t_{52}$ and $t_{54}$ are the timing at which the laser beam power drops below $(P_w+P_b)/2$, the time $t_{53}$ is the timing at which the laser beam power exceeds $(P_w+P_b)/2$, and the time $t_{55}$ is the timing at which the laser beam power exceeds $(P_e+P_b)/2$.

During the intervals $T_{top(5T)}$, $T_{off(5T)}$, and $T_{last(5T)}$ (the heating intervals), the recording layer 14 of the optical recording medium 1 receives a large amount of energy and its temperature exceeds the melting point, and during the interval $T_{cl(5T)}$ (the cooling interval), the recording layer 14 of the optical recording medium 1 is rapidly cooled. Thereby, a recording mark of a length corresponding to 5T is formed in the recording layer 14 of the optical recording medium 1.

Figure 8:
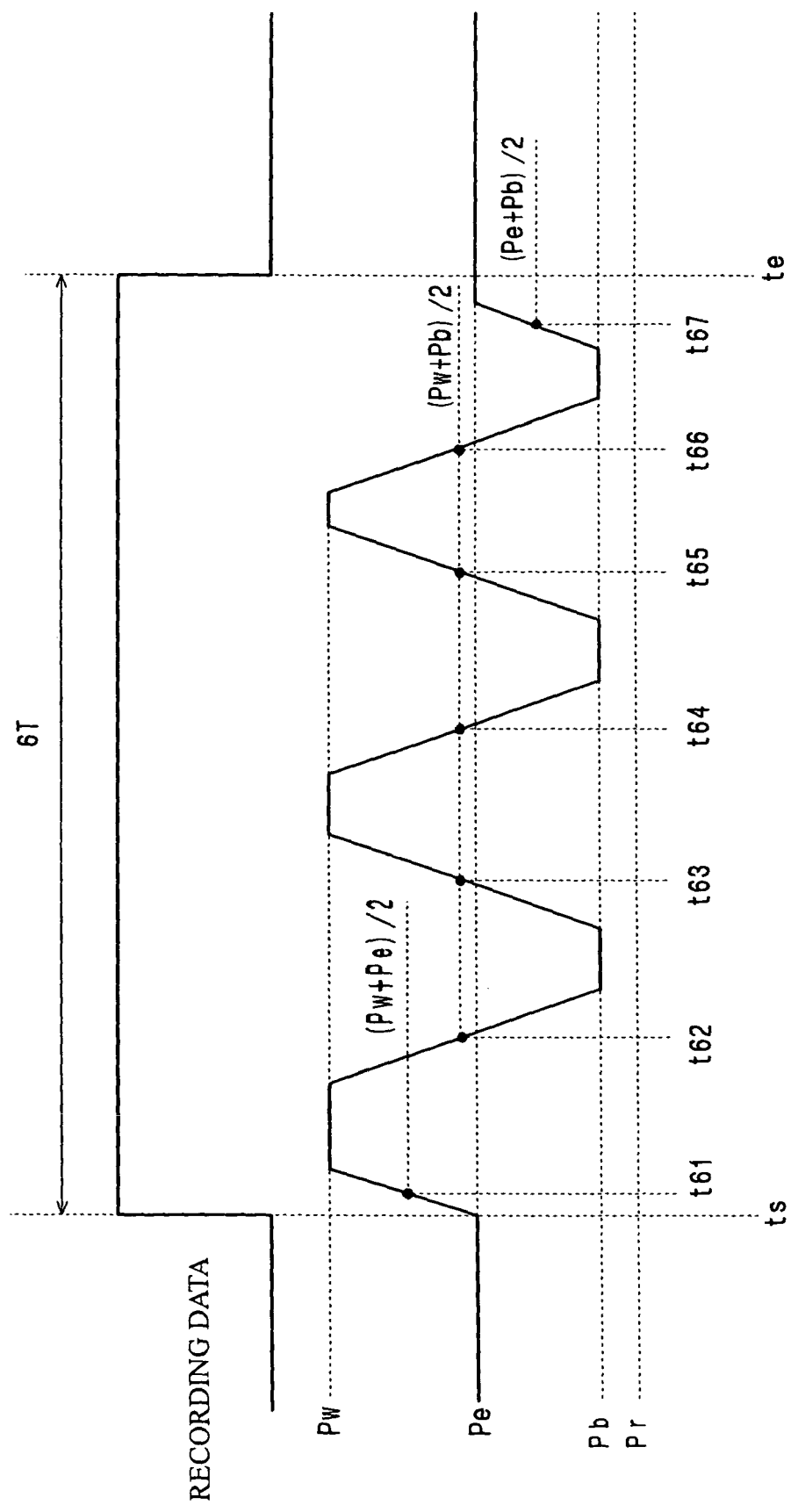
FIG. 8 is a drawing illustrating the pulse train pattern in the case of forming a recording mark of a length corresponding to 6T in a preferred embodiment of the present invention.

FIG. 8 is a drawing illustrating the pulse train pattern in the case of forming a recording mark of a length corresponding to 6T.

As shown in FIG. 8, when forming a recording mark of a length corresponding to 6T, the number of pulses in the laser beam is set to 3. More specifically, during the period from the time $t_s$ to the time $t_e$, the set consisting of the combination of the laser beam power being first set to Pw and then being set to the power Pb is repeated three times. Here, the laser beam power before the time $t_s$ is set to Pe and the power of the laser beam begins to rise at the time $t_s$. In addition, the laser beam power at the time $t_e$ is set to Pe or Pb.

Here, when the interval from time $t_{61}$ to time $t_{62}$ shown on FIG. 8 is defined to be $T_{top(6T)}$, the interval from time $t_{62}$ to time $t_{63}$ is defined to be $T_{off(6T-1)}$, the interval from time $t_{63}$ to time $t_{64}$ is defined to be $T_{mp(6T)}$, the interval from time $t_{64}$ to time $t_{65}$ is defined to be $T_{off(6T-2)}$, the interval from time $t_{65}$ to time $t_{66}$ is defined to be $T_{last(6T)}$, and the interval from time $t_{66}$ to time $t_{67}$ is defined to be $T_{cl(6T)}$, $T_{top(6T)}$ is set to ~1.0T, $T_{off(6T-1)}$ is set to ~1.0T, $T_{mp(6T)}$ is set to ~1.0T, $T_{off(6T-2)}$ is set to ~1.0T, $T_{last(6T)}$ is set to ~0.7T, and $T_{cl(6T)}$ is set to ~0.7T. As shown in FIG. 8, the time $t_{61}$ is the timing at which the laser beam power exceeds (Pw+Pe)/2, the times $t_{62}$, $t_{64}$ and $t_{66}$ are the timing at which the laser beam power drops below (Pw+Pb)/2, the times $t_{63}$ and $t_{65}$ are the timing at which the laser beam power exceeds (Pw+Pb)/2, and the time $t_{67}$ is the timing at which the laser beam power exceeds (Pe+Pb)/2.

During the intervals $T_{top(6T)}$, $T_{off(6T-1)}$, $T_{mp(6T)}$, $T_{off(6T-2)}$, and $T_{last(6T)}$ (the heating intervals), the recording layer 14 of the optical recording medium 1 receives a large amount of energy and its temperature exceeds the melting point, and during the interval $T_{cl(6T)}$ (the cooling interval), the recording layer 14 of the optical recording medium 1 is rapidly cooled. Thereby, a recording mark of a length corresponding to 6T is formed in the recording layer 14 of the optical recording medium 1.

Figure 9:
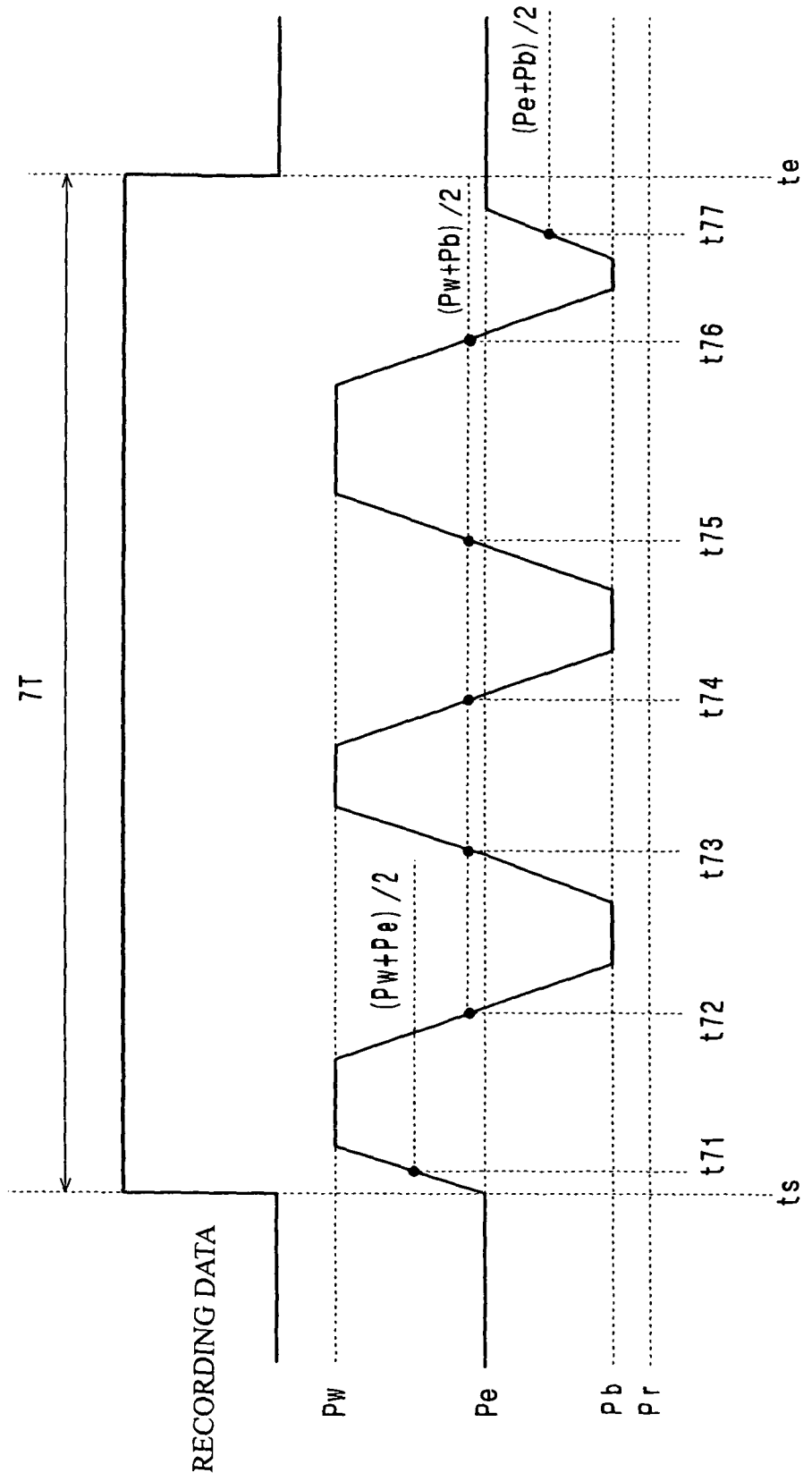
FIG. 9 is a drawing illustrating the pulse train pattern in the case of forming a recording mark of a length corresponding to 7T in a preferred embodiment of the present invention.

FIG. 9 is a drawing illustrating the pulse train pattern in the case of forming a recording mark of a length corresponding to 7T.

As shown in FIG. 9, when forming a recording mark of a length corresponding to 7T, the number given by (n−1)/2 is 3 so the number of pulses in the laser beam is set to 3. More specifically, during the period from the time $t_s$ to the time $t_e$, the set consisting of the combination of the laser beam power being first set to Pw and then being set to the power Pb is repeated three times. Here, the laser beam power before the time $t_s$ is set to Pe and the power of the laser beam begins to rise at the time $t_s$. In addition, the laser beam power at the time $t_e$ is set to Pe or Pb.

Here, when the interval from time $t_{71}$ to time $t_{72}$ shown on FIG. 9 is defined to be $T_{top(7T)}$, the interval from time $t_{72}$ to time $t_{73}$ is defined to be $T_{off(7T-1)}$, the interval from time $t_{73}$ to time $t_{74}$ is defined to be $T_{mp(7T)}$, the interval from time $t_{74}$ to time $t_{75}$ is defined to be $T_{off(7T-2)}$, the interval from time $t_{75}$ to time $t_{76}$ is defined to be $T_{last(7T)}$, and the interval from time $t_{76}$ to time $t_{77}$ is defined to be $T_{cl(7T)}$, $T_{top(7T)}$ is set to ~1.0T, $T_{off(7T-1)}$ is set to ~1.0T, $T_{mp(7T)}$ is set to ~1.0T, $T_{off(7T-2)}$ is set to ~1.0T, $T_{last(7T)}$ is set to ~1.3T, and $T_{cl(7T)}$ is set to ~0.7T. As shown in FIG. 9, the time $t_{71}$ is the timing at which the laser beam power exceeds (Pw+Pe)/2, the times $t_{72}$, $t_{74}$ and $t_{76}$ are the timing at which the laser beam power drops below (Pw+Pb)/2, the times $t_{73}$ and $t_{75}$ are the timing at which the laser beam power exceeds (Pw+Pb)/2, and the time $t_{77}$ is the timing at which the laser beam power exceeds (Pe+Pb)/2.

During the intervals $T_{top(7T)}$, $T_{off(7T-1)}$, $T_{mp(7T)}$, $T_{off(7T-2)}$, and $T_{last(7T)}$ (the heating intervals), the recording layer 14 of the optical recording medium 1 receives a large amount of energy and its temperature exceeds the melting point, and during the interval $T_{cl(7T)}$ (the cooling interval), the recording layer 14 of the optical recording medium 1 is rapidly cooled. Thereby, a recording mark of a length corresponding to 7T is formed in the recording layer 14 of the optical recording medium 1.

Figure 10:
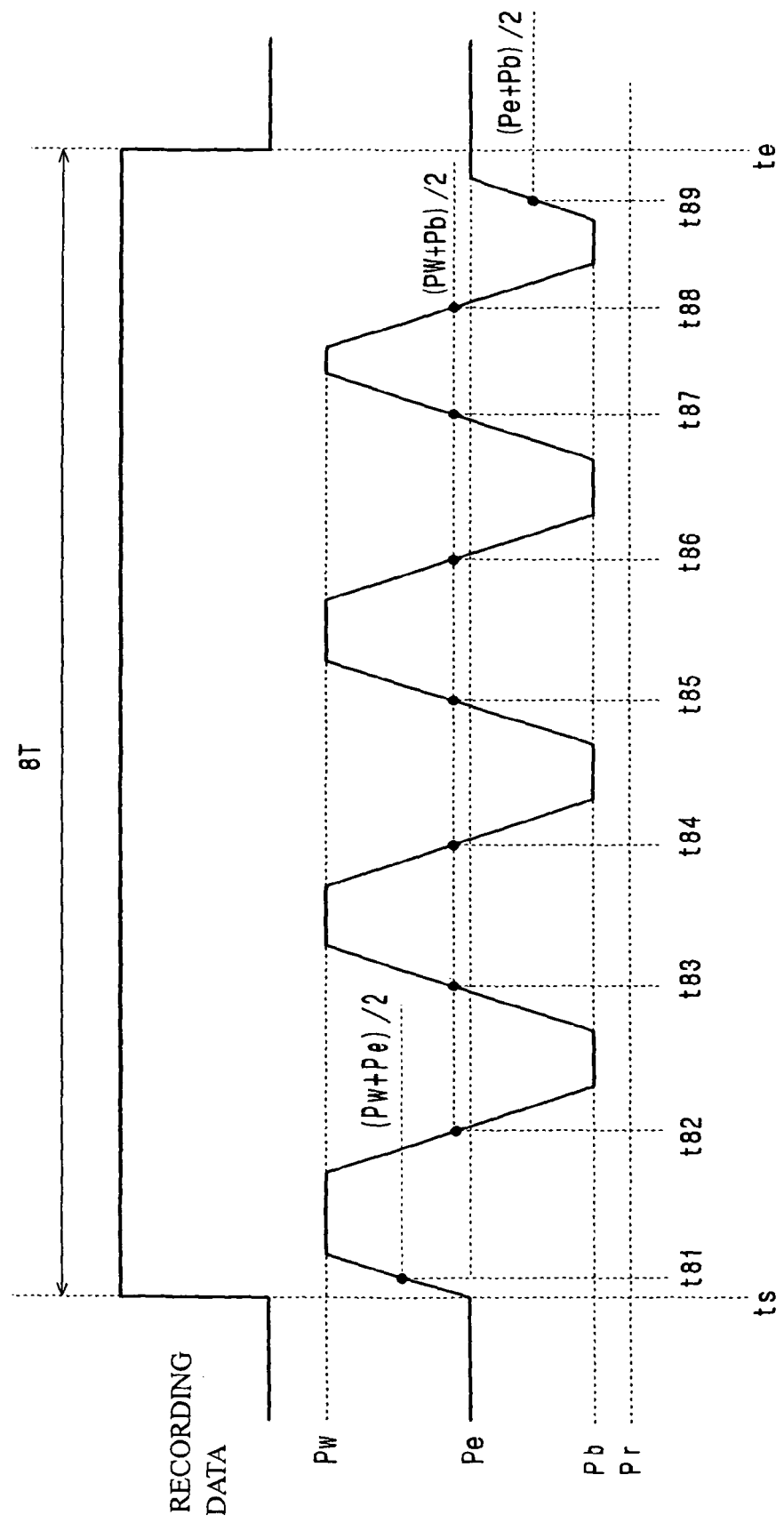
FIG. 10 is a drawing illustrating the pulse train pattern in the case of forming a recording mark of a length corresponding to 8T in a preferred embodiment of the present invention.

FIG. 10 is a drawing illustrating the pulse train pattern in the case of forming a recording mark of a length corresponding to 8T.

As shown in FIG. 10, when forming a recording mark of a length corresponding to 8T, the number of pulses in the laser beam is set to 4. More specifically, during the period from the time $t_s$ to the time $t_e$, the set consisting of the combination of the laser beam power being first set to Pw and then being set to the power Pb is repeated four times. Here, the laser beam power before the time $t_s$ is set to Pe and the power of the laser beam begins to rise at the time $t_s$. In addition, the laser beam power at the time $t_e$ is set to Pe or Pb.

Here, when the interval from time $t_{81}$ to time $t_{82}$ shown on FIG. 10 is defined to be $T_{top(8T)}$, the interval from time $t_{82}$ to time $t_{83}$ is defined to be $T_{off(8T-1)}$, the interval from time $t_{83}$ to time $t_{84}$ is defined to be $T_{mp(8T-1)}$, the interval from time $t_{84}$ to time $t_{85}$ is defined to be $T_{off(8T-2)}$, the interval from time $t_{85}$ to time $t_{86}$ is defined to be $T_{mp(8T-2)}$, the interval from time $t_{86}$ to time $t_{87}$ is defined to be $T_{off(8T-3)}$, the interval from time $t_{87}$ to time $t_{88}$ is defined to be $T_{last(8T)}$, and the interval from time $t_{88}$ to time $t_{89}$ is defined to be $T_{cl(8T)}$, $T_{top(8T)}$ is set to ~1.0T, $T_{off(8T-1)}$ is set to ~1.0T, $T_{mp(8T-1)}$ is set to ~1.0T, $T_{off(8T-2)}$ is set to ~1.0T, $T_{mp(8T-2)}$ is set to ~1.0T, $T_{off(8T-3)}$ is set to ~1.0T, $T_{last(8T)}$ is set to ~0.7T, and $T_{cl(8T)}$ is set to ~0.7T. As shown in FIG. 10, the time $t_{81}$ is the timing at which the laser beam power exceeds (Pw+Pe)/2, the times $t_{82}$, $t_{84}$, $t_{86}$ and $t_{88}$ are the timing at which the laser beam power drops below (Pw+Pb)/2, the times $t_{83}$, $t_{85}$ and $t_{87}$ are the timing at which the laser beam power exceeds (Pw+Pb)/2, and the time $t_{89}$ is the timing at which the laser beam power exceeds (Pe+Pb)/2.

During the intervals $T_{top(8T)}$, $T_{off(8T-1)}$, $T_{mp(8T-1)}$, $T_{off(8T-2)}$, $T_{mp(8T-2)}$, $T_{off(8T-3)}$, and $T_{last(8T)}$ (the heating intervals), the recording layer 14 of the optical recording medium 1 receives a large amount of energy and its temperature exceeds the melting point, and during the interval $T_{cl(8T)}$ (the cooling intervals), the recording layer 14 of the optical recording medium 1 is rapidly cooled. Thereby, a recording mark of a length corresponding to 8T is formed in the recording layer 14 of the optical recording medium 1.

As described above, in the case where a phase change material film having a high crystallization velocity is used for forming the recording layer 14 in order to achieve a high data transfer rate, the phase change material film is liable to be re-crystallized. In order to prevent the re-crystallization of the phase change material film, it is effective to set the recording power Pw high and the erasing power Pe low, thereby setting the ratio Pe/Pw of the recording power Pw and the erasing power Pe low. Concretely, in order to achieve a data transfer rate of 70 Mbps or greater taking the format efficiency to be approximately 80%, it is preferable to set the ratio Pe/Pw of the recording power Pw and the erasing power Pe to be equal to or smaller than 0.5 and in order to achieve a data transfer rate of 140 Mbps or greater taking the format efficiency to be approximately 80%, it is preferable to set the ratio Pe/Pw of the recording power Pw and the erasing power Pe to be equal to or smaller than 0.3. In this case, since the erasing power Pe is set low, a recording mark is hard to erase. However, in this embodiment, since the bottom power Pb is set to be higher than the reproducing power Pr, excessive cooling during the cooling interval can be suppressed and as a result, since the bottom power Pb helps to erase the recording mark, it is possible to erase the recording mark without difficulty. It is therefore possible to maintain a high erase efficiency even when data are recorded by setting a high data transfer rate.

Here, the "erase efficiency" is defined to be the decrease in the carrier of a single signal recorded previously in the case that the single signal consisting of stipulated recording marks is continuously recorded and then continuously overwritten once with another single signal consisting of recording marks different from the recording marks described above, so if this is low the jitter is higher. Although an erase efficiency of 30 dB or greater is required in order to achieve a good overwrite, according to this embodiment, since the bottom power Pb is set to be higher than the reproducing power Pr, it is possible to maintain a high erase efficiency equal to or higher than 30 dB.

Further, since in the case where the bottom power Pb is set too high, since sufficient cooling effect cannot be expected and re-crystallization of the phase change material film occurs, as described above, it is necessary to set the bottom power Pb to be lower than the erasing power Pe.

As described above, in this embodiment, since the bottom power Pb of the laser beam used for recording data is set to be higher than the reproducing power Pr, even in the case where the recording layer 14 is constituted by a phase change material film having a high crystallization velocity in order to achieve a high transfer rate and the ratio Pe/Pw of the recording power Pw and the erasing power Pw is correspondingly set low, an excellent erasing characteristic can be obtained when a recording mark is overwritten.

Next, another preferred embodiment of the present invention will be explained.

In this embodiment, the recording power Pw of the laser beam shined in order to melt the recording layer 14, bottom powers Pb1 and Pb2 of the laser beam shined when cooling the recording layer 14 and an erasing power Pe of the laser beam shined when crystallizing the recording layer 14 are set so as to have the following relationship:

Pw>Pe>Pb2>Pb1.

Accordingly, in this embodiment, when recording data to the optical recording medium 1, the controller 4 controls the laser driving circuit 5 via the laser control circuit 9 so that the power of the laser beam assumes the values Pw, Pe, Pb1 or Pb2 based on the recording condition setting information read from the optical recording medium 1, and the laser driving circuit 5 controls the power of the laser driving signal based thereupon. As explained later in detail, the bottom power Pb2 is a bottom power during the cooling interval and the bottom power Pb1 is a bottom power during intervals other than the cooling interval. In this manner, in this embodiment, the bottom power Pb2 during the cooling interval is set to be higher than the bottom power Pb1 during intervals other than the cooling interval.

The bottom power Pb2 is preferably set to be higher than the reproducing power Pr of the laser beam used for reproducing data but is not particularly limited to being set higher than the reproducing power Pr.

In this embodiment, in order to prevent the phase change material film forming the recording layer 14 from being re-crystallized, the recording power Pw of the laser beam used for recording data is set high and the erasing power Pe thereof is set low. Actual values of the recording power Pw and the erasing power Pe can be set similarly to in the previous embodiment.

Here follows a description of the modulation scheme used in a method of recording information according to this embodiment.

In the information recording method according to this preferred embodiment, the (1,7) RLL modulation scheme can be adopted. Next, examples of pulse train patterns will be explained in the case where the (1,7) RLL modulation scheme is adopted.

Figure 11:
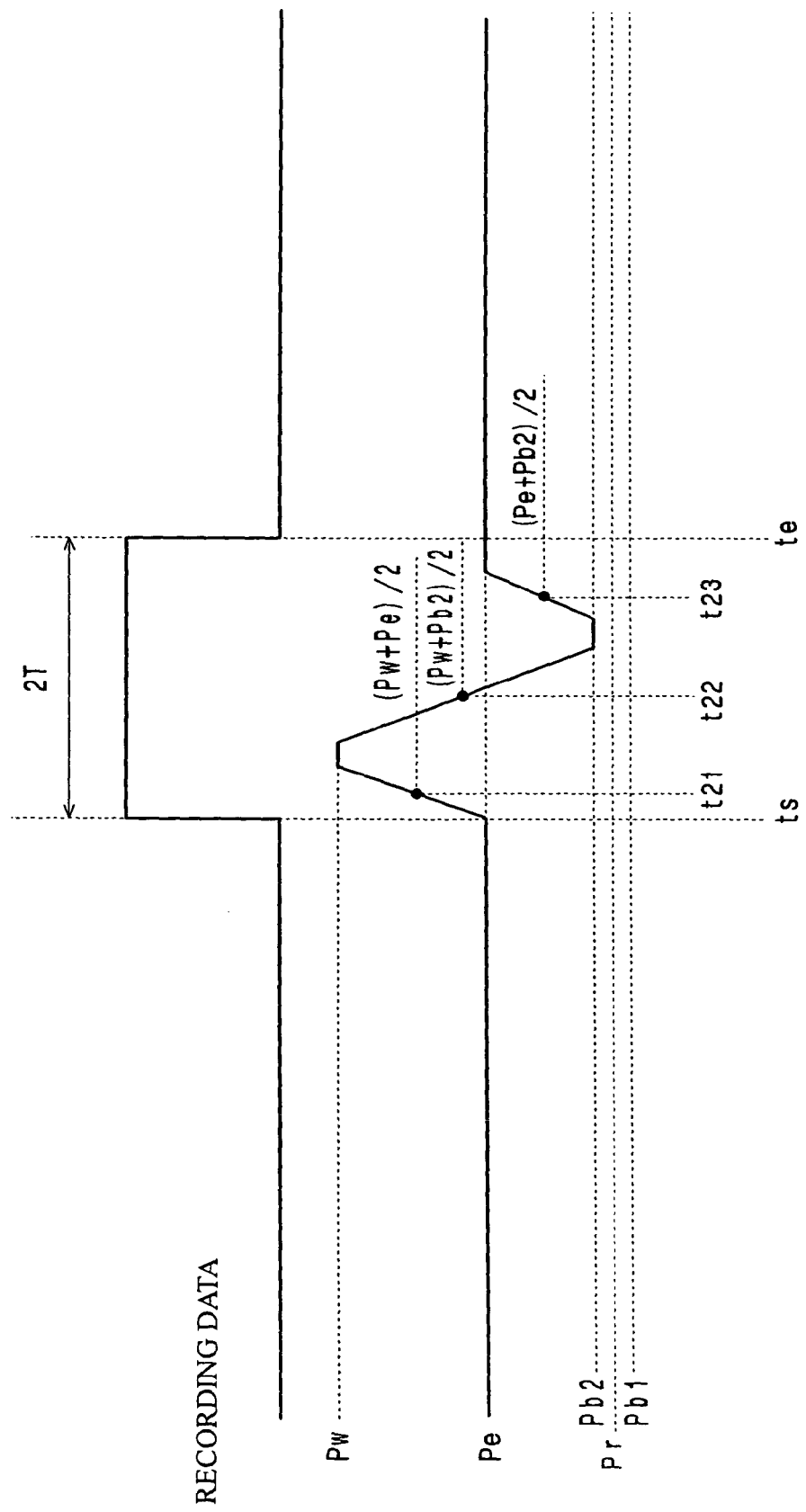
FIG. 11 is a drawing illustrating the pulse train pattern in the case of forming a recording mark of a length corresponding to 2T in another preferred embodiment of the present invention.

FIG. 11 is a drawing illustrating the pulse train pattern in the case of forming a recording mark of a length corresponding to 2T.

As shown in FIG. 11, when forming a recording mark of a length corresponding to 2T, the number of pulses in the laser beam is set to 1. More specifically, taking the time $t_s$ to be the timing at which the laser beam is positioned at the starting point of the recording mark and the time $t_e$ to be the timing at which the laser beam is positioned at the ending point of the recording mark, during the period from the time $t_s$ to the time $t_e$, the laser beam power is first set to Pw and then set to the power Pb2. Here, the laser beam power before the time $t_s$ is set to Pe and the power of the laser beam begins to rise at the time t. In addition, the laser beam power at the time $t_e$ is set to Pe or Pb2.

Here, when the interval from time $t_{21}$ to time $t_{22}$ shown on FIG. 11 is defined to be $T_{top(2T)}$ and the interval from time $t_{22}$ to time $t_{23}$ is defined to be $T_{cl(2T)}$, $T_{top(2T)}$ is set to ~0.6T and $T_{cl(2T)}$ is set to ~0.7T. As shown in FIG. 11, the time $t_{21}$ is the timing at which the laser beam power exceeds (Pw+Pe)/2, the time $t_{22}$ is the timing at which the laser beam power drops below (Pw+Pb2)/2, and the time $t_{23}$ is the timing at which the laser beam power exceeds (Pe+Pb2)/2.

During the interval $T_{top(2T)}$ (the heating interval), the recording layer 14 of the optical recording medium 1 receives a large amount of energy and its temperature exceeds the melting point, and during the interval $T_{cl(2T)}$ (the cooling interval), the recording layer 14 of the optical recording medium 1 is rapidly cooled. Thereby, a recording mark of a length corresponding to 2T is formed in the recording layer 14 of the optical recording medium 1.

Figure 12:
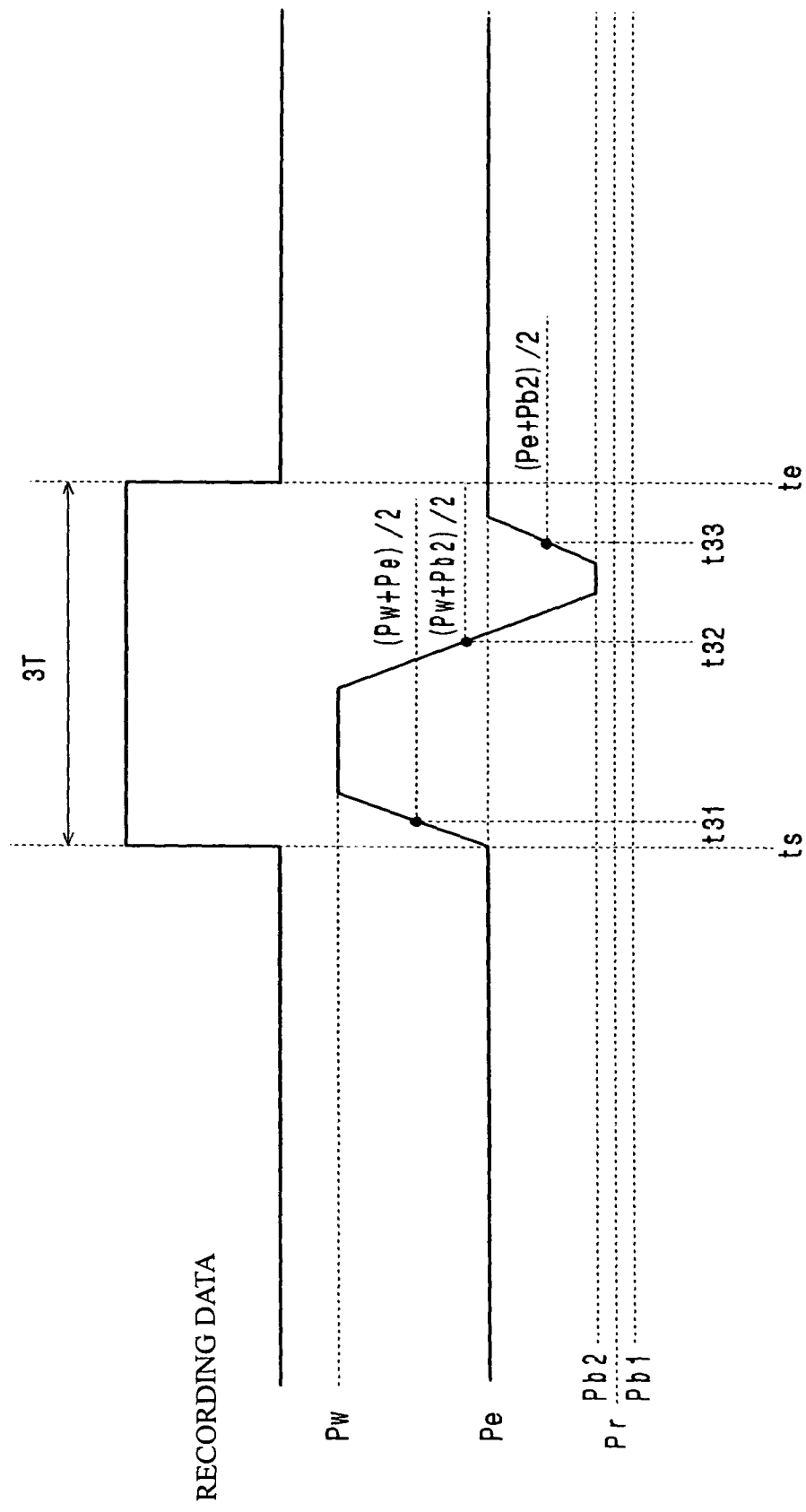
FIG. 12 is a drawing illustrating the pulse train pattern in the case of forming a recording mark of a length corresponding to 3T in another preferred embodiment of the present invention.

FIG. 12 is a drawing illustrating the pulse train pattern in the case of forming a recording mark of a length corresponding to 3T.

As shown in FIG. 5, when forming a recording mark of a length corresponding to 3T, the number of pulses in the laser beam is set to 1. More specifically, during the period from the time $t_s$ to the time $t_e$, the laser beam power is first set to Pw and then set to the power Pb2. Here, the laser beam power before the time t, is set to Pe and the power of the laser beam begins to rise at the time $t_s$. In addition, the laser beam power at the time $t_e$ is set to Pe or Pb2.

Here, when the interval from time $t_{31}$ to time $t_{32}$ shown on FIG. 5 is defined to be $T_{top(3T)}$ and the interval from time $t_{32}$ to time $t_{33}$ is defined to be $T_{cl(3T)}$, $T_{top(3T)}$ is set to ~1.3T and $T_{cl(3T)}$ is set to ~0.7T. As shown in FIG. 12, the time $t_{31}$ is the timing at which the laser beam power exceeds (Pw+Pe)/2, the time $t_{32}$ is the timing at which the laser beam power drops below (Pw+Pb2)/2, and the time $t_{33}$ is the timing at which the laser beam power exceeds (Pe+Pb2)/2.

During the interval $T_{top(3T)}$ (the heating interval), the recording layer 14 of the optical recording medium 1 receives a large amount of energy and its temperature exceeds the melting point, and during the interval $T_{cl(3T)}$ (the cooling interval), the recording layer 14 of the optical recording medium 1 is rapidly cooled. Thereby, a recording mark of a length corresponding to 3T is formed in the recording layer 14 of the optical recording medium 1.

Figure 13:
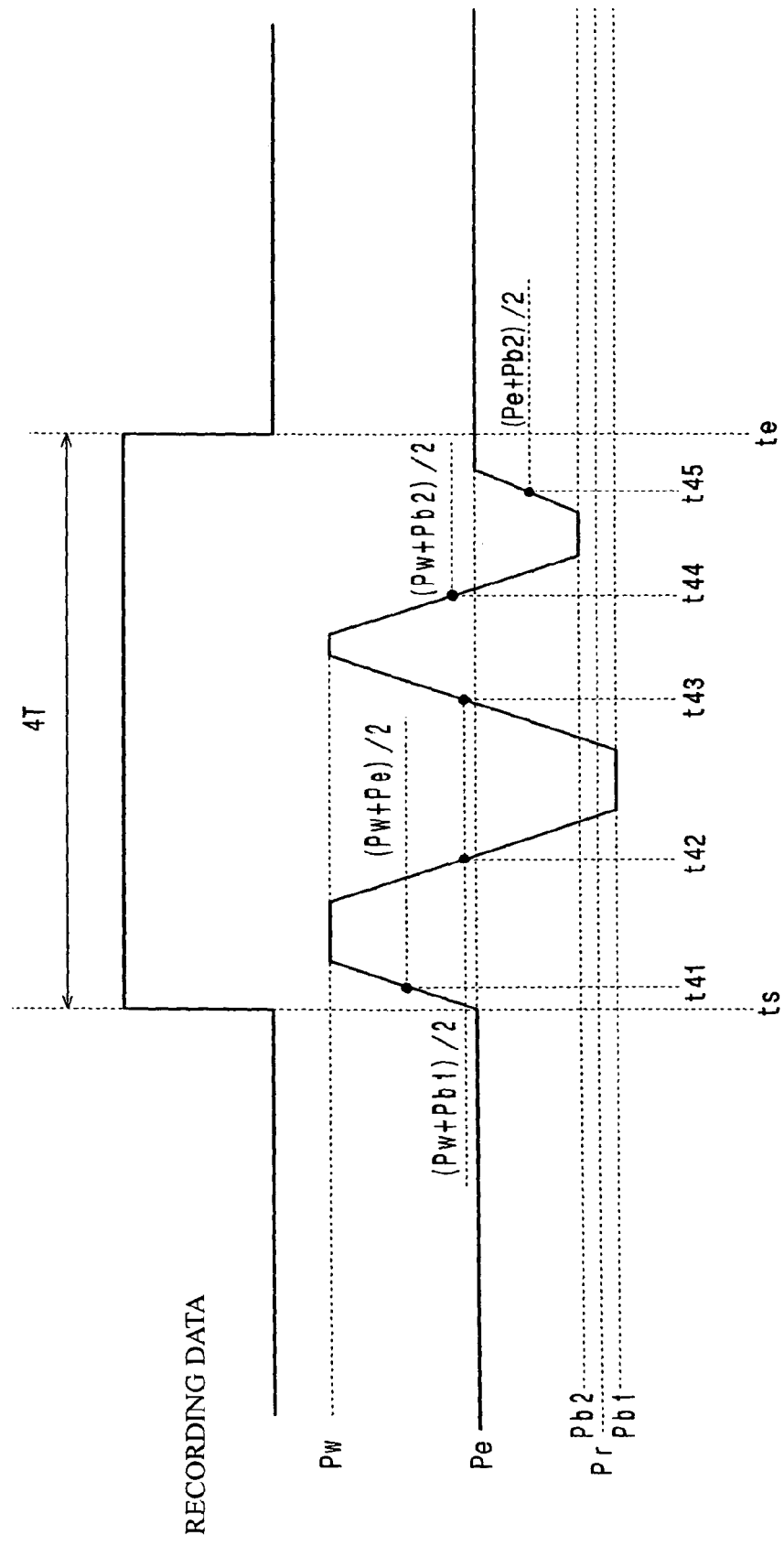
FIG. 13 is a drawing illustrating the pulse train pattern in the case of forming a recording mark of a length corresponding to 4T in another preferred embodiment of the present invention.

FIG. 13 is a drawing illustrating the pulse train pattern in the case of forming a recording mark of a length corresponding to 4T.

As shown in FIG. 13, when forming a recording mark of a length corresponding to 4T, the number of pulses of the laser beam is set to 2. More specifically, during the period from the time $t_s$ to the time $t_e$, the setting of the laser beam power first to Pw and then to the power Pb1 or Pb2 is repeated twice. Here, the laser beam power before the time t, is set to Pe and the power of the laser beam begins to rise at the time $t_s$. In addition, the laser beam power at the time $t_e$ is set to Pe or Pb2. The first bottom power is set to Pb1 and the second bottom power is set to Pb2.

Here, when the interval from time $t_{41}$ to time $t_{42}$ shown on FIG. 13 is defined to be $T_{top(4T)}$, the interval from time $t_{42}$ to time $t_{43}$ is defined to be $T_{off(4T)}$, the interval from time $t_{43}$ to time $t_{44}$ is defined to be $T_{last(4T)}$, and the interval from time $t_{44}$ to time $t_{45}$ is defined to be $T_{cl(4T)}$, $T_{top(4T)}$ is set to ~1.0T, $T_{off(4T)}$ is set to ~1.0T, $T_{last(4T)}$ is set to ~0.7T, and $T_{cl(4T)}$ is set to ~0.7T. As shown in FIG. 13, the time $t_{41}$ is the timing at which the laser beam power exceeds (Pw+Pe)/2, the time $t_{42}$ is the timing at which the laser beam power drops below (Pw+Pb1)/2, the time $t_{43}$ is the timing at which the laser beam power exceeds (Pw+Pb1)/2, the time $t_{44}$ is the timing at which the laser beam power drops below (Pw+Pb2)/2 and the time $t_{45}$ is the timing at which the laser beam power exceeds (Pw+Pb2)/2.

During the intervals $T_{top(4T)}$, $T_{off(4T)}$, and $T_{last(4T)}$ (the heating intervals), the recording layer 14 of the optical recording medium 1 receives a large amount of energy and its temperature exceeds the melting point, and during the interval $T_{cl(4T)}$ (the cooling interval), the recording layer 14 of the optical recording medium 1 is rapidly cooled. Thereby, a recording mark of a length corresponding to 4T is formed in the recording layer 14 of the optical recording medium 1.

Figure 14:
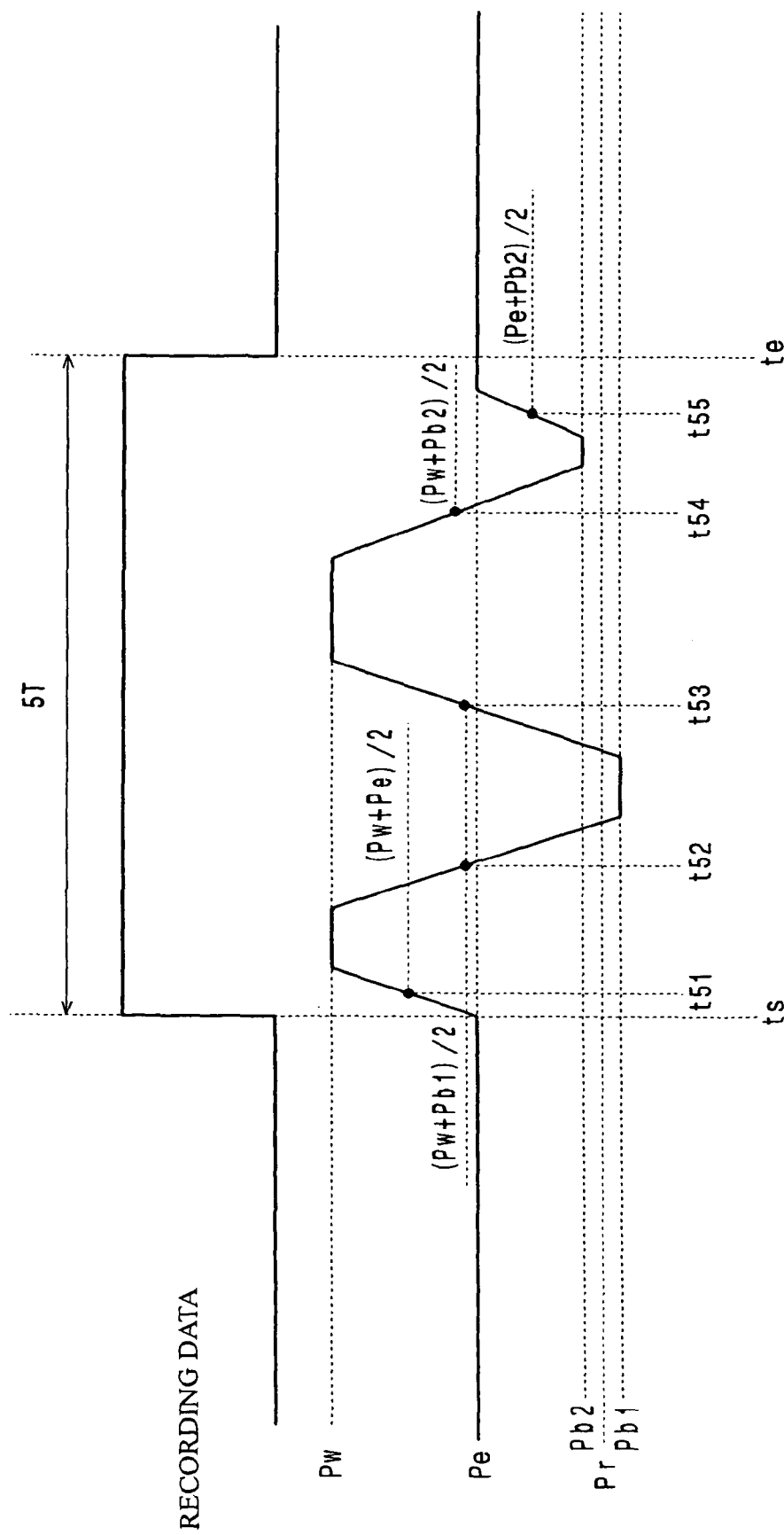
FIG. 14 is a drawing illustrating the pulse train pattern in the case of forming a recording mark of a length corresponding to 5T in another preferred embodiment of the present invention.

FIG. 14 is a drawing illustrating the pulse train pattern in the case of forming a recording mark of a length corresponding to 5T.

As shown in FIG. 14, when forming a recording mark of a length corresponding to 5T, the number of pulses of the laser beam is set to 2. More specifically, during the period from the time $t_s$ to the time $t_e$, the setting of the laser beam power first to Pw and then to the power Pb1 or Pb2 is repeated twice. Here, the laser beam power before the time t, is set to Pe and the power of the laser beam begins to rise at the time $t_s$. In addition, the laser beam power at the time $t_e$ is set to Pe or Pb2. The first bottom power is set to Pb1 and the second bottom power is set to Pb2.

Here, when the interval from time $t_{51}$ to time $t_{52}$ shown on FIG. 14 is defined to be $T_{top(5T)}$, the interval from time $t_{52}$ to time $t_{53}$ is defined to be $T_{off(5T)}$, the interval from time $t_{53}$ to time $t_{54}$ is defined to be $T_{last(5T)}$, and the interval from time $t_{54}$ to time $t_{55}$ is defined to be $T_{cl(5T)}$, $T_{top(5T)}$ is set to ~1.0T, $T_{off(5T)}$ is set to ~1.0T, $T_{last(5T)}$ is set to ~1.3T, and $T_{cl(5T)}$ is set to 0.7T. As shown in FIG. 14, the time $t_{51}$ is the timing at which the laser beam power exceeds (Pw+Pe)/2, the time $t_{52}$ is the timing at which the laser beam power drops below (Pw+Pb1)/2, the time $t_{53}$ is the timing at which the laser beam power exceeds (Pw+Pb1)/2, the time $t_{54}$ is the timing at which the laser beam power drops below (Pw+Pb2)/2 and the time $t_{55}$ is the timing at which the laser beam power exceeds (Pe+Pb2)/2.

During the intervals $T_{top(5T)}$, $T_{off(5T)}$, and $T_{last(5T)}$ (the heating intervals), the recording layer 14 of the optical recording medium 1 receives a large amount of energy and its temperature exceeds the melting point, and during the interval $T_{cl(5T)}$ (the cooling interval), the recording layer 14 of the optical recording medium 1 is rapidly cooled. Thereby, a recording mark of a length corresponding to 5T is formed in the recording layer 14 of the optical recording medium 1.

Figure 15:
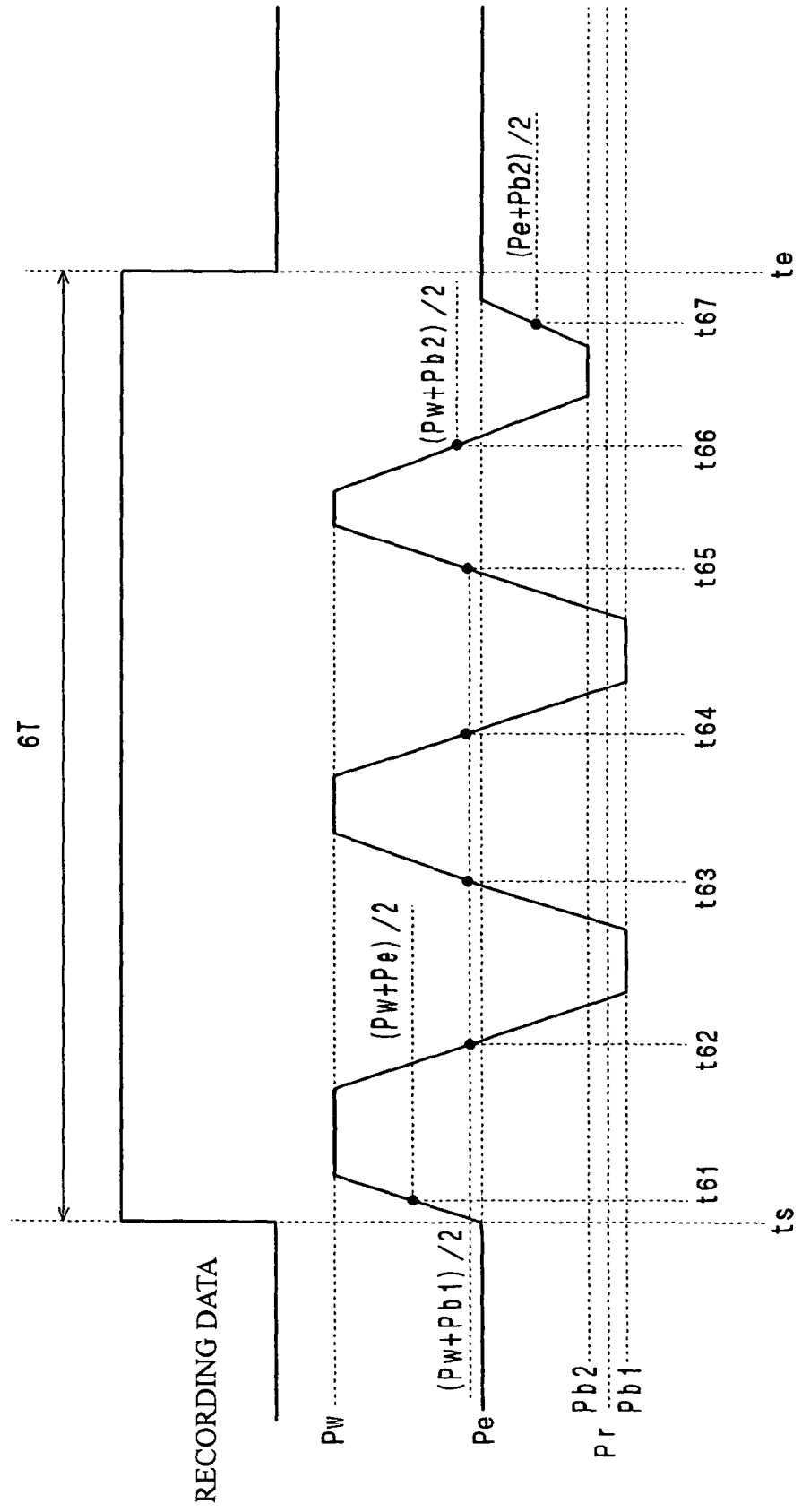
FIG. 15 is a drawing illustrating the pulse train pattern in the case of forming a recording mark of a length corresponding to 6T in another preferred embodiment of the present invention.

FIG. 15 is a drawing illustrating the pulse train pattern in the case of forming a recording mark of a length corresponding to 6T.

As shown in FIG. 15, when forming a recording mark of a length corresponding to 6T, the number of pulses of the laser beam is set to 3. More specifically, during the period from the time $t_s$ to the time $t_e$, the setting of the laser beam power first to Pw and then to the power Pb1 or Pb2 is repeated three times. Here, the laser beam power before the time t, is set to Pe and the power of the laser beam begins to rise at the time $t_s$. In addition, the laser beam power at the time $t_e$ is set to Pe or Pb2. Each of the first and second bottom powers is set to Pb1 and the third bottom power is set to Pb2.

Here, when the interval from time $t_{61}$ to time $t_{62}$ shown on FIG. 8 is defined to be $T_{top(6T)}$, the interval from time $t_{62}$ to time $t_{63}$ is defined to be $T_{off(6T-1)}$, the interval from time $t_{63}$ to time $t_{64}$ is defined to be $T_{mp(6T)}$, the interval from time $t_{64}$ to time $t_{65}$ is defined to be $T_{off(6T-2)}$, the interval from time $t_{65}$ to time $t_{66}$ is defined to be $T_{last(6T)}$, and the interval from time $t_{66}$ to time $t_{67}$ is defined to be $T_{cl(6T)}$, $T_{top(6T)}$ is set to ~1.0T, $T_{off(6T-1)}$ is set to ~1.0T, $T_{mp(6T)}$ is set to ~1.0T, $T_{off(6T-2)}$ is set to ~1.0T, $T_{last(6T)}$ is set to ~0.7T, and $T_{cl(6T)}$ is set to ~0.7T. As shown in FIG. 15, the time $t_{61}$ is the timing at which the laser beam power exceeds (Pw+Pe)/2, the times $t_{62}$ and $t_{64}$ are the timing at which the laser beam power drops below (Pw+Pb1)/2, the times $t_{63}$ and $t_{65}$ are the timing at which the laser beam power exceeds (Pw+Pb1)/2, the time $t_{66}$ is the timing at which the laser beam power drops below (Pw+Pb2)/2, and the time $t_{67}$ is the timing at which the laser beam power exceeds (Pe+Pb2)/2.

During the intervals $T_{top(6T)}$, $T_{off(6T-1)}$, $T_{mp(6T)}$, $T_{off(6T-2)}$, and $T_{last(6T)}$ the heating intervals), the recording layer 14 of the optical recording medium 1 receives a large amount of energy and its temperature exceeds the melting point, and during the interval $T_{cl(6T)}$ (the cooling interval), the recording layer 14 of the optical recording medium 1 is rapidly cooled. Thereby, a recording mark of a length corresponding to 6T is formed in the recording layer 14 of the optical recording medium 1.

Figure 16:
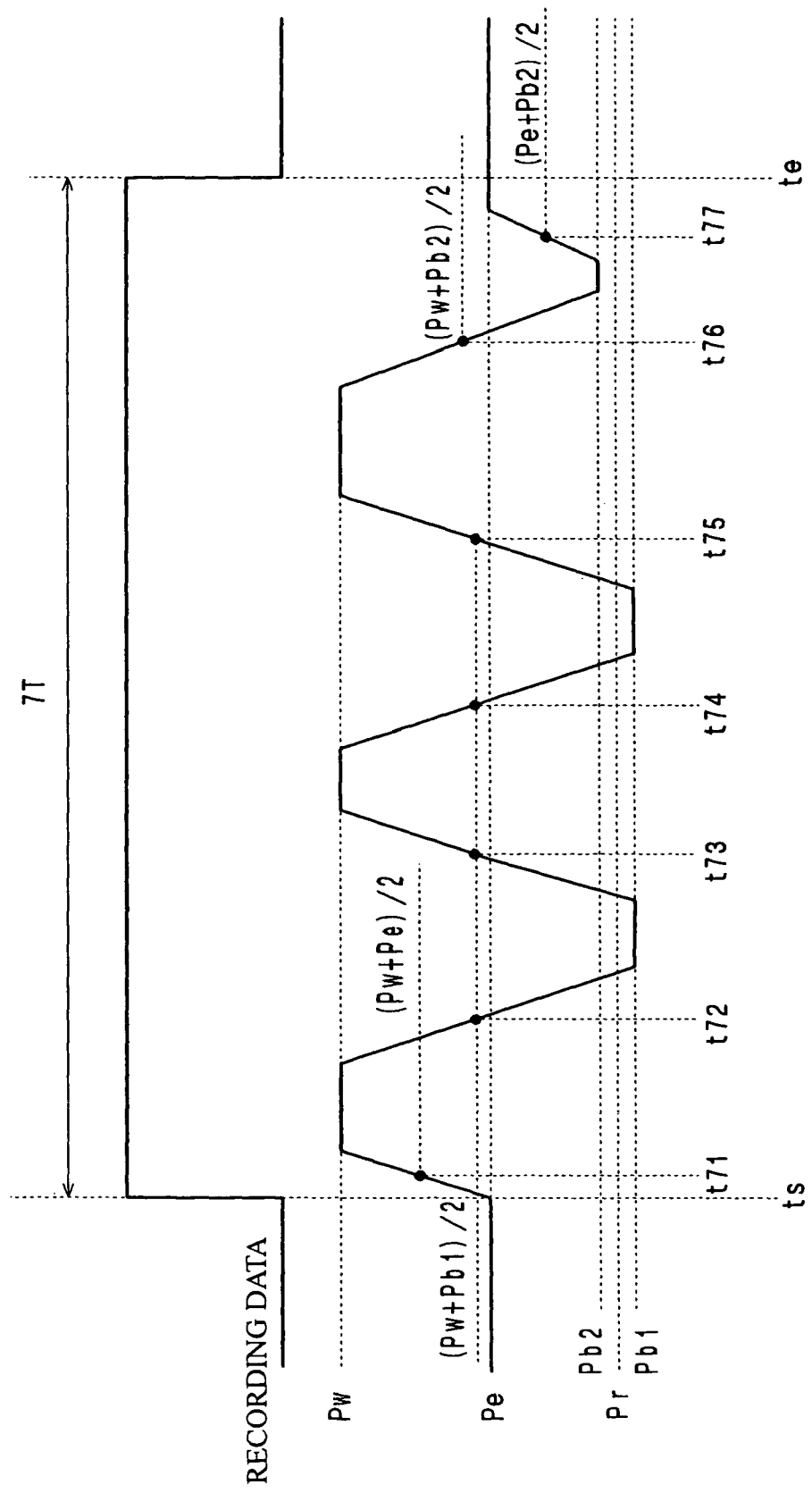
FIG. 16 is a drawing illustrating the pulse train pattern in the case of forming a recording mark of a length corresponding to 7T in another preferred embodiment of the present invention.

FIG. 16 is a drawing illustrating the pulse train pattern in the case of forming a recording mark of a length corresponding to 7T.

As shown in FIG. 16, when forming a recording mark of a length corresponding to 7T, the number given by (n−1)/2 is 3 so the number of pulses of the laser beam is set to 3. More specifically, during the period from the time t, to the time $t_e$, the setting of the laser beam power first set to Pw and then to the power Pb1 or Pb2 is repeated three times. Here, the laser beam power before the time $t_s$ is set to Pe and the power of the laser beam begins to rise at the time $t_s$. In addition, the laser beam power at the time $t_e$ is set to Pe or Pb2. Each of the first and second bottom powers is set to Pb1 and the third bottom power is set to Pb2.

Here, when the interval from time $t_{71}$ to time $t_{72}$ shown on FIG. 16 is defined to be $T_{top(7T)}$, the interval from time $t_{72}$ to time $t_{73}$ is defined to be $T_{off(7T-1)}$, the interval from time $t_{73}$ to time $t_{74}$ is defined to be $T_{mp(7T)}$, the interval from time $t_{74}$ to time $t_{75}$ is defined to be $T_{off(7T-2)}$, the interval from time $t_{75}$ to time $t_{76}$ is defined to be $T_{last(7T)}$, and the interval from time $t_{76}$ to time $t_{77}$ is defined to be $T_{cl(7T)}$, $T_{top(7T)}$ is set to ~1.0T, $T_{off(7T-1)}$ is set to ~1.0T, $T_{mp(7T)}$ is set to ~1.0T, $T_{off(7T-2)}$ is set to ~1.0T, $T_{last(7T)}$ is set to ~1.3T, and $T_{cl(7T)}$ is set to ~0.7T. As shown in FIG. 16, the time $t_{71}$ is the timing at which the laser beam power exceeds (Pw+Pe)/2, the times $t_{72}$ and $t_{74}$ are the timing at which the laser beam power drops below (Pw+Pb1)/2, the times $t_{73}$ and $t_{75}$ are the timing at which the laser beam power exceeds (Pw+Pb1)/2, the time $t_{76}$ is the timing at which the laser beam power drops below (Pw+Pb2)/2, and the time $t_{77}$ is the timing at which the laser beam power exceeds (Pe+Pb2)/2.

During the intervals $T_{top(7T)}$, $T_{off(7T-1)}$, $T_{mp(7T)}$, $T_{off(7T-2)}$, and $T_{last(7T)}$ (the heating intervals), the recording layer 14 of the optical recording medium 1 receives a large amount of energy and its temperature exceeds the melting point, and during the interval $T_{cl(7T)}$ (the cooling interval), the recording layer 14 of the optical recording medium 1 is rapidly cooled. Thereby, a recording mark of a length corresponding to 7T is formed in the recording layer 14 of the optical recording medium 1.

Figure 17:
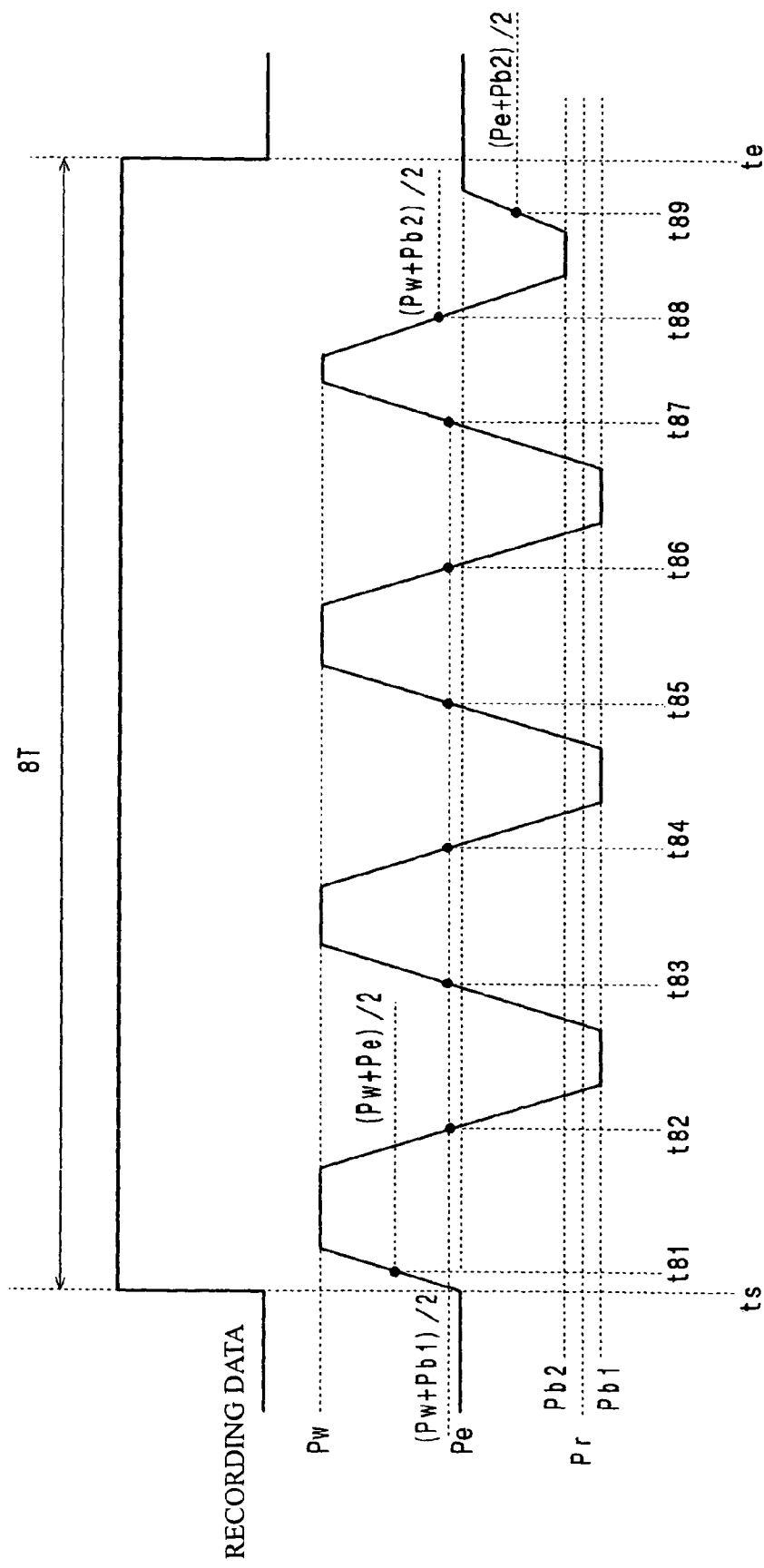
FIG. 17 is a drawing illustrating the pulse train pattern in the case of forming a recording mark of a length corresponding to 8T in another preferred embodiment of the present invention.

FIG. 17 is a drawing illustrating the pulse train pattern in the case of forming a recording mark of a length corresponding to 8T.

As shown in FIG. 17, when forming a recording mark of a length corresponding to 8T, the number of pulses of the laser beam is set to 4. More specifically, during the period from the time $t_s$ to the time $t_e$, the setting of the laser beam power first to Pw and then to the power Pb1 or Pb2 is repeated four times. Here, the laser beam power before the time $t_s$ is set to Pe and the power of the laser beam begins to rise at the time $t_s$. In addition, the laser beam power at the time $t_e$ is set to Pe or Pb2. Each of the first to third and bottom powers is set to Pb1 and the third bottom power is set to Pb2.

Here, when the interval from time $t_{81}$ to time $t_{82}$ shown on FIG. 17 is defined to be $T_{top(8T)}$, the interval from time $t_{82}$ to time $t_{83}$ is defined to be $T_{off(8T-1)}$, the interval from time $t_{83}$ to time $t_{84}$ is defined to be $T_{mp(8T-1)}$, the interval from time $t_{84}$ to time $t_{85}$ is defined to be $T_{off(8T-2)}$, the interval from time $t_{85}$ to time $t_{86}$ is defined to be $T_{mp(8T-2)}$, the interval from time $t_{86}$ to time $t_{87}$ is defined to be $T_{off(8T-3)}$, the interval from time $t_{87}$ to time $t_{88}$ is defined to be $T_{last(8T)}$, and the interval from time $t_{88}$ to time $t_{89}$ is defined to be $T_{cl(8T)}$. $T_{top(8T)}$ is set to ~1.0T, $T_{off(8T-1)}$ is set to ~1.0T, $T_{mp(8T-1)}$ is set to ~1.0T, $T_{off(8T-2)}$ is set to ~1.0T, $T_{mp(8T-2)}$ is set to ~1.0T, $T_{off(8T-3)}$ is set to ~1.0T, $T_{last(8T)}$ is set to ~0.7T, and $T_{cl(8T)}$ is set to ~0.7T. As shown in FIG. 17, the time $t_{81}$ is the timing at which the laser beam power exceeds (Pw+Pe)/2, the times $t_{82}$, $t_{84}$ and $t_{86}$ are the timing at which the laser beam power drops below (Pw+Pb1)/2, the times $t_{83}$, $t_{85}$ and $t_{87}$ are the timing at which the laser beam power exceeds (Pw+Pb1)/2, the time $t_{88}$ is the timing at which the laser beam power drops below (Pw+Pb2)/2, and the time $t_{89}$ is the timing at which the laser beam power exceeds (Pe+Pb2)/2.

During the intervals $T_{top(8T)}$, $T_{off(8T-1)}$, $T_{mp(8T-1)}$, $T_{off(8T-2)}$, $T_{mp(8T-2)}$, $T_{off(8T-3)}$, and $T_{last(8T)}$ (the heating intervals), the recording layer 14 of the optical recording medium 1 receives a large amount of energy and its temperature exceeds the melting point, and during the interval $T_{cl(8T)}$ (the cooling intervals), the recording layer 14 of the optical recording medium 1 is rapidly cooled. Thereby, a recording mark of a length corresponding to 8T is formed in the recording layer 14 of the optical recording medium 1.

As described above, in the case where a phase change material film having a high crystallization velocity is used for forming the recording layer 14 in order to achieve a high data transfer rate, the phase change material film is liable to be re-crystallized. In order to prevent the re-crystallization of the phase change material film, it is effective to set the recording power Pw high and the erasing power Pe low, thereby setting the ratio Pe/Pw of the recording power Pw and the erasing power Pe low. Concretely, in order to achieve a data transfer rate of 70 Mbps or greater taking the format efficiency to be approximately 80%, it is preferable to set the ratio Pe/Pw of the recording power Pw and the erasing power Pe to be equal to or smaller than 0.5 and in order to achieve a data transfer rate of 140 Mbps or greater taking the format efficiency to be approximately 80%, it is preferable to set the ratio Pe/Pw of the recording power Pw and the erasing power Pe to be equal to or smaller than 0.3. In this case, since the erasing power Pe is set low, a recording mark is hard to erase. However, in this embodiment, since the bottom power Pb2 during the cooling interval is set to be higher than the bottom power Pb1 during other intervals, excessive cooling during the interval $T_{cl}$ can be suppressed and as a result, since the bottom power Pb2 helps to erase the recording mark, it is possible to erase the recording mark without difficulty. It is therefore possible to maintain a high erase efficiency even when data are recorded by setting a high data transfer rate.

As described above, the "erase efficiency" is defined to be the decrease in the carrier of a single signal recorded previously in the case that the single signal consisting of stipulated recording marks is continuously recorded and then continuously overwritten once with another single signal consisting of recording marks different from the recording marks described above, so if this is low the jitter is higher. Although an erase efficiency of 30 dB or greater is required in order to achieve a good overwrite, according to this embodiment, since the bottom power Pb2 during the cooling interval is set to be higher than the bottom power Pb1 during other intervals, it is possible to maintain a high erase efficiency equal to or higher than 30 dB.

Further, since in the case where the bottom power Pb2 during the cooling interval is set too high, since sufficient cooling effect cannot be expected and re-crystallization of the phase change material film occurs, as described above, it is necessary to set the bottom power Pb2 to be lower than the erasing power Pe.

The present invention is in no way limited to the aforementioned embodiments, but rather various modifications are possible within the scope of the invention as recited in the claims, and these are naturally included within the scope of the invention.

Figure 18:
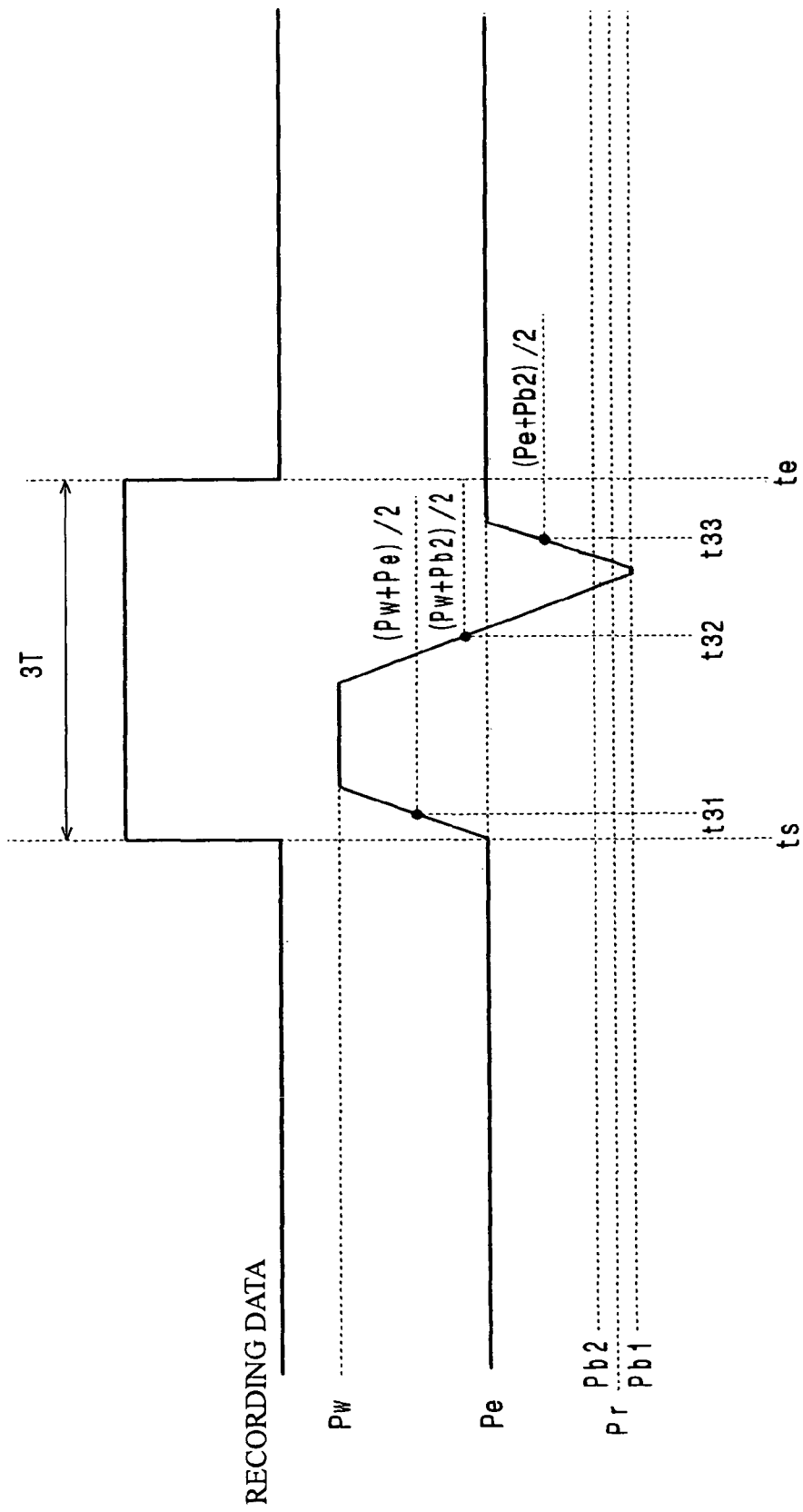
FIG. 18 is a drawing illustrating the pulse train pattern in the case of setting a bottom power as Pb1 and forming a recording mark of a length corresponding to 3T.

For example, in the former preferred embodiment, although the bottom power Pb of the laser beam is set to be higher than the reproducing power Pr for forming all recording marks, the bottom power Pb of the laser beam may be set to be higher than the reproducing power Pr only in the case of forming some recording marks. In this case, as apparent from the Comparative Examples described later, since the erase efficiency is markedly lowered as the length of a recording mark is shorter, it is preferable to set the bottom power Pb of the laser beam to be higher than the reproducing power Pr in the case of forming a recording mark having a short length. For example, the bottom power Pb may be set to be higher than the reproducing power Pr in the case of forming a recording mark of a length corresponding to 2T and the bottom power Pb may be set to be equal to or lower than the reproducing power Pr in the case of forming a recording mark of a length corresponding to one of 3T to 8T. Therefore, it is possible to set the bottom power to be Pb2 higher than Pr in the case of forming a recording mark of a length corresponding to 2T, as shown in FIG. 11, and it is possible to set the bottom power to be Pb1 lower than Pr in the case of forming a recording mark of a length corresponding to one of 3T to 8T, as shown in FIG. 18.

Further, in the latter preferred embodiment, although only the bottom power of the laser beam during the cooling interval is set to be higher than the bottom power of the laser beam during intervals other than the cooling interval, one or more bottom powers of the laser beam during the intervals other than the cooling interval may be set to be equal to the bottom power Pb2 of the laser beam during the cooling interval insofar as the bottom power of the laser beam during the cooling interval is higher than at least one bottom power during the intervals other than the cooling interval. For example, in the pulse train pattern shown in FIG. 17, the bottom power of the laser beam may be set to Pb1 during the period between the times $t_{82}$ to $t_{83}$ and the period between the times $t_{84}$ to $t_{85}$ and the bottom power of the laser beam may be set to Pb2 during the period between the times $t_{86}$ to $t_{87}$ and the period between the times $t_{88}$ to $t_{89}$.

Furthermore, in the latter preferred embodiment, although the bottom power is varied between two levels (Pb1 and Pb2), the bottom power may be varied between three or more levels. In this case, it is necessary to employ a level other than the minimum level among the levels of the bottom powers as the bottom power of the laser beam during the cooling interval and the maximum level of the bottom powers is preferably employed as the bottom power of the laser beam during the cooling interval.

Moreover, in the above described preferred embodiments, the number of pulses of the laser beam was set to 1, 1, 2, 2, 3, 3 and 4 when forming recording marks with lengths corresponding to 2T, 3T, 4T, 5T, 6T, 7T and 8T, respectively. However, the pulse train pattern according to the present invention is not limited thereto and a different pulse train pattern may be employed.

In addition, while the optical recording medium 1 shown in FIG. 3 is given as an example of a suitable optical recording medium for the application of the method of recording information to an optical recording medium according to the present embodiment, the information recording method according to the present invention is not limited in being applicable only to this optical recording medium, but rather it is applicable to any kind of optical recording medium as long as it is a recordable optical recording medium.

As described above, the present invention can provide an optical recording medium, a method of recording information to an optical recording medium and an information recording apparatus that are suited to achieving high data transfer rates. Specifically, the present invention is particularly advantageous in the case where the data transfer rate is set to be equal to or higher than 70 Mbps and most advantageous in the case where the data transfer rate is set to be equal to or higher than 140 Mbps.

WORKING EXAMPLE

Working Example 1

First, an optical recording medium 1 like that shown in FIG. 3 that had a substrate 11 with a thickness of approximately 1.1 mm, a reflective layer 12 with a thickness of 100 nm, a second dielectric layer 13 with a thickness of 20 nm, a recording layer 14 with a thickness of 12 nm, a first dielectric layer 15 with a thickness of 35 nm, and a light transmission layer 16 with a thickness of approximately 100 μm was prepared.

A signal consisting of a recording mark of a length corresponding to 7T was recorded in the optical recording medium 1 using the pulse train pattern shown in FIG. 9 under the conditions shown in Table 1.

TABLE 1

| Clock frequency | 262.5 MHz |
| --- | --- |
| Clock period (1T) | 3.8 nsec |
| Linear velocity | 22.8 m/sec |
| Modulation scheme | (1,7) RLL |
| Data transfer rate | 175 Mbps |
| Format efficiency | 80% |
| Data transfer rate (taking efficiency into account) | 140 Mbps |
| Channel bit length | 0.13 μm/bit |
| Numerical Aperture | 0.85 |
| Laser Wavelength | 405 nm |

The recording power (Pw), the erasing power (Pe) and the bottom power (Pb) of a laser beam were set to the values illustrated in Table 2. In the case of reproducing data recorded in such an optical recording medium 1, since the reproducing power Pr of the laser beam is normally set to about 0.3 mW taking the degradation in reproduction of data into account, in this Working Example, Pb was higher than Pr.

TABLE 2

| Pw | 9.0 mW |
| --- | --- |
| Pe | 2.6 mW |
| Pb | 0.5 mW |

Next, the signal consisting of a record mark of a length corresponding to 7T recoded in the optical recording medium 1 was overwritten with a signal consisting of each of recording marks of lengths corresponding to 2T, 3T, 4T, 5T, 6T and 8T under the conditions illustrated in Tables 1 and 2 and the erase efficiency was measured in each case. Each of the pulse train patterns shown in FIGS. 4, 5, 6, 7, 8, and 10 was used for recording each of the signals. The results of the measurement are shown in Table 3.

TABLE 3

| Recording mark used for overwriting the recording mark | Erase efficiency |
| --- | --- |
| 2T | 32.4 dB |
| 3T | 33.0 dB |
| 4T | 34.8 dB |
| 5T | 36.5 dB |
| 6T | 36.4 dB |
| 8T | 38.2 dB |

As shown in Table 3, it was found that in each case, an erase efficiency equal to or greater than 30 dB was obtained.

Next, as a Comparative Example, the recording power (Pw), the erasing power (Pe) and the bottom power (Pb) of the laser beam were set to the values illustrated in Table 4 and the signal consisting of a record mark of a length corresponding to 7T recoded in the optical recording medium 1 was overwritten with a signal consisting of each of recording marks of lengths corresponding to 2T, 3T, 4T, 5T, 6T and 8T under the conditions illustrated in Table 1, thereby measuring the erase efficiency.

TABLE 4

| Pw | 9.0 mW |
| --- | --- |
| Pe | 2.6 mW |
| Pb | 0.1 mW |

As described above, in the case of reproducing data recorded in such an optical recording medium 1, since a reproducing power Pr of the laser beam is normally set to about 0.3 mW taking the degradation in reproduction of data into account, in this Comparative Example, Pb was lower than Pr. The results of the measurement are shown in Table 5.

TABLE 5

| Recording mark used for overwriting the recording mark | Erase efficiency |
|---|---|
| 2T | 27.2 dB |
| 3T | 30.3 dB |
| 4T | 32.1 dB |
| 5T | 35.0 dB |
| 6T | 35.9 dB |
| 8T | 37.7 dB |

As shown in Table 5, it was found that in the case where the recorded signal was overwritten with a recording mark of a length corresponding to 2T which was the shortest recording mark, the erase efficiency was low. It is reasonable to conclude that the interval $T_{top(2T)}$ was too short and the recording layer 14 of the optical recording medium 1 had already excessively cooled before the cooling interval $T_{cl(2T)}$ terminated. More specifically, when the recording layer 14 of the optical recording medium 1 excessively cooled before the cooling interval $T_{cl(2T)}$ terminated, an old recording mark was not erased until the power of the laser beam was raised to Pe, whereby the erase efficiency was lowered.

Working Example 2

An optical recording medium 1 with the same structure as the optical recording medium 1 used in Working Example 1 was first prepared.

A signal consisting of a record mark of a length corresponding to 7T was recorded in the optical recording medium 1 using the pulse train pattern shown in FIG. 16 under the conditions illustrated in Table 1.

The recording power (Pw), the erasing power (Pe) and the bottom power (Pb1 and Pb2) of a laser beam were set to the values illustrated in Table 6.

TABLE 6

| Pw | 9.0 mW |
|---|---|
| Pe | 2.6 mW |
| Pb2 | 0.5 mW |
| Pb1 | 0.1 mW |

Next, the signal consisting of a record mark of a length corresponding to 7T recoded in the optical recording medium 1 was overwritten with a signal consisting of each of recording marks of lengths corresponding to 2T, 3T, 4T, 5T, 6T and 8T under the conditions illustrated in Tables 1 and 6 and the erase efficiency was measured in each case. Each of the pulse train patterns shown in FIGS. 11, 12, 13, 14, 15, and 17 was used for recording each of the signals. The results of the measurement are shown in Table 7.

TABLE 7

| Recording mark used for overwriting the recording mark | Erase efficiency |
|---|---|
| 2T | 31.1 dB |
| 3T | 32.1 dB |
| 4T | 33.7 dB |
| 5T | 35.3 dB |
| 6T | 36.2 dB |
| 8T | 37.9 dB |

As shown in Table 7, it was found that in each case, the erase efficiency equal to or 30 dB was obtained.

The invention claimed is:

1. A method of recording information to an optical recording medium where information is recorded by forming on the optical recording medium a plurality of recording marks selected from a group consisting of several types of recording marks each with different lengths, comprising:

projecting a laser beam whose power is modulated by a pulse train including one or more pulses having a level of recording power Pw, a number of the one or more pulses being determined in accordance with the types of the recording marks each with different lengths in accordance with the (1,7) RLL modulation scheme;

setting a bottom power Pb of the laser beam used for forming at least one recording mark contained in said group to be higher than a reproducing power Pr of the laser beam used for reproducing information;

in response to setting the bottom power Pb of the laser beam, setting a data transfer rate to be equal to or higher than 70 Mbps, thereby recording information in the optical recording medium; and setting a ratio of a recording power Pw of the laser beam used for forming the at least one recording mark and an erasing power Pe thereof to be less than or equal to 0.5.

2. A method of recording information to an optical recording medium in accordance with claim 1, further comprising:

setting the bottom power Pb to be lower than the erasing power Pe of the laser beam used for forming the at least one recording mark.

3. A method of recording information to an optical recording medium in accordance with claim 1, further comprising:

setting a ratio of the recording power Pw of the laser beam used for forming the at least one recording mark and the erasing power Pe thereof to be equal to or smaller than 0.3.

4. A method of recording information to an optical recording medium in accordance with claim 1, further comprising:

setting the data transfer rate to be equal to or higher than 140 Mbps.

5. An apparatus for recording information to an optical recording medium comprising at least a recording layer where information is recorded by forming a plurality of recording marks selected from a group consisting of several types of recording marks each with different lengths, comprising:

means for projecting a laser beam whose power is modulated by a pulse train including one or more pulses having a level of recording power Pw, a number of the one or more pulses being determined in accordance with the types of the recording marks each with different lengths in accordance with the (1,7) RLL modulation scheme;

means for setting a bottom power Pb of the laser beam used for forming at least one recording mark contained in the group to be higher than a reproducing power Pr of the laser beam used for reproducing the information and performing the recording of the information; and means for setting a data transfer rate to be equal to or higher than 70 Mbps and setting a ratio of a recording power Pw of the laser beam used for forming the at least one recording mark and an erasing power Pe thereof to be less than or equal to 0.5.

6. An apparatus for recording information to an optical recording medium in accordance with claim 5, wherein:
said means for setting the bottom power Pb sets the bottom power Pb to be lower than the erasing power Pe of the laser beam used for forming the at least one recording mark.

7. An apparatus for recording information to an optical recording medium in accordance with claim 5, wherein:
said means for setting the data transfer rate sets the data transfer rate to be equal to or higher than 140 Mbps.

8. An optical recording medium comprising at least a recording layer where information is recorded by projecting a laser beam thereon and forming a plurality of recording marks selected from a group consisting of several types of recording marks each with different lengths in accordance with the (1,7) RLL modulation scheme, a power of the laser beam being modulated by a pulse train including one or more pulses having a level of recording power Pw, a number of the one or more pulses being determined in accordance with the types of the recording marks each with different lengths, wherein:
the optical recording medium is recorded with setting information to set a bottom power Pb of the laser beam used for forming at least one recording mark contained in the group to be higher than a reproducing power Pr of the laser beam used for reproducing the information;
set a data transfer rate to be equal to or higher than 70 Mbps; and
set a ratio of the recording power Pw of the laser beam used for forming the at least one recording mark and an erasing power Pe thereof to be equal to or smaller than 0.5.

9. An optical recording medium in accordance with claim 8, further recorded with setting information to set the bottom power Pb to be lower than the erasing power Pe of the laser beam used for forming the at least one recording mark.

10. An optical recording medium in accordance with claim 8, wherein the recording layer is a phase-change film having a high crystallization velocity that has a first reflectance in a crystalline phase and a second reflectance in an amorphous phase, the difference between the first reflectance and the second reflectance being detectable to reproduce recorded information.

* * * * *